(12) United States Patent
Kim et al.

(10) Patent No.: US 11,180,135 B2
(45) Date of Patent: Nov. 23, 2021

(54) AUTONOMOUS PARKING SYSTEM AND VEHICLE

(71) Applicant: LG Electronics Inc., Seoul (KR)

(72) Inventors: Daebum Kim, Seoul (KR); Taeho Noh, Seoul (KR); Hyukmin Eum, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 16/263,609

(22) Filed: Jan. 31, 2019

(65) Prior Publication Data
US 2019/0232952 A1 Aug. 1, 2019

(30) Foreign Application Priority Data

Jan. 31, 2018 (KR) ........................ 10-2018-0012368

(51) Int. Cl.
| | | |
|---|---|---|
| *B60W 30/06* | (2006.01) | |
| *G06K 9/00* | (2006.01) | |
| *G01C 21/36* | (2006.01) | |
| *G08G 1/14* | (2006.01) | |

(52) U.S. Cl.
CPC ......... *B60W 30/06* (2013.01); *G01C 21/3611* (2013.01); *G06K 9/00805* (2013.01); *G06K 9/00812* (2013.01); *G08G 1/143* (2013.01)

(58) Field of Classification Search
CPC ................. B60W 30/06; B60W 50/14; B60W 2050/146; B60W 10/20; B60W 2420/42; G01C 21/3611; G06K 9/00805; G06K 9/00812; G08G 1/143
See application file for complete search history.

(56) References Cited

U.S. PATENT DOCUMENTS

| | | | | |
|---|---|---|---|---|
| 8,665,118 | B1 * | 3/2014 | Woodard | G08G 1/148 |
| | | | | 340/932.2 |
| 9,557,736 | B1 * | 1/2017 | Silver | G06K 9/00812 |
| 9,558,664 | B1 * | 1/2017 | Gaebler | G08G 1/0112 |
| 10,543,851 | B2 * | 1/2020 | Freistadt | B60W 30/06 |
| 10,562,525 | B2 * | 2/2020 | Hasejima | B60W 30/06 |
| 10,583,829 | B2 * | 3/2020 | Kim | B60W 50/082 |
| 10,597,043 | B2 * | 3/2020 | Kim | B62D 15/0285 |
| 10,773,714 | B2 * | 9/2020 | Suzuki | B60W 40/105 |
| 10,793,143 | B2 * | 10/2020 | Lee | G06K 9/00825 |
| 10,854,084 | B2 * | 12/2020 | Kuwabara | G08G 1/144 |

(Continued)

FOREIGN PATENT DOCUMENTS

| | | |
|---|---|---|
| JP | 2004299475 | 10/2004 |
| JP | 2011216016 | 10/2011 |

(Continued)

*Primary Examiner* — Luis A Martinez Borrero
(74) *Attorney, Agent, or Firm* — Fish & Richardson P.C.

(57) ABSTRACT

An autonomous parking system includes an object detection apparatus, and one or more processors. The one or more processors are configured to: perform an initial parking operation for parking a vehicle into a first parking space along a first path, the first path including one or more first turnaround points; during the initial parking operation, detect a second parking space using the object detection apparatus; generate a second path for parking the vehicle into the second parking space; and, in response to user input, perform at least one of a first parking operation along the first path or a second parking operation along the second path.

19 Claims, 21 Drawing Sheets

(56) References Cited

U.S. PATENT DOCUMENTS

| | | | |
|---|---|---|---|
| 10,899,365 B2* | 1/2021 | Hayakawa | B62D 15/0285 |
| 10,926,701 B2* | 2/2021 | Suzuki | G08G 1/168 |
| 10,988,136 B2* | 4/2021 | Kato | B60W 50/14 |
| 2007/0057816 A1* | 3/2007 | Sakakibara | B62D 15/0275 340/932.2 |
| 2013/0265174 A1* | 10/2013 | Scofield | G08G 1/096883 340/932.2 |
| 2015/0134185 A1* | 5/2015 | Lee | G05D 1/0214 701/26 |
| 2015/0175205 A1* | 6/2015 | Park | B62D 15/0285 701/41 |
| 2016/0238399 A1* | 8/2016 | Caira | G08G 1/146 |
| 2017/0016738 A1* | 1/2017 | Sakuma | G01C 21/3614 |
| 2017/0036695 A1* | 2/2017 | Lee | B62D 15/027 |
| 2017/0177956 A1* | 6/2017 | Zhang | G06K 9/00805 |
| 2017/0253236 A1* | 9/2017 | Hayakawa | B60W 30/06 |
| 2017/0369078 A1* | 12/2017 | Freistadt | B62D 15/0285 |
| 2018/0037262 A1* | 2/2018 | Imai | G05D 1/0246 |
| 2018/0043905 A1* | 2/2018 | Kim | B60W 50/14 |
| 2018/0093664 A1* | 4/2018 | Kim | B60W 10/20 |
| 2018/0107207 A1* | 4/2018 | Kim | B60W 30/06 |
| 2018/0120851 A1* | 5/2018 | Shin | B60W 30/0956 |
| 2018/0162385 A1* | 6/2018 | Seo | B60W 10/06 |
| 2018/0186407 A1* | 7/2018 | Kim | B62D 15/0285 |
| 2018/0194343 A1* | 7/2018 | Lorenz | G05D 1/0282 |
| 2018/0236993 A1* | 8/2018 | Mielenz | B60W 10/20 |
| 2018/0286240 A1* | 10/2018 | Harai | B60W 50/14 |
| 2018/0307919 A1* | 10/2018 | Hayakawa | G06T 7/60 |
| 2018/0308359 A1* | 10/2018 | Hayakawa | B62D 15/0285 |
| 2018/0315312 A1* | 11/2018 | Hayakawa | G08G 1/14 |
| 2018/0322349 A1* | 11/2018 | Hayakawa | B60R 21/00 |
| 2018/0339701 A1* | 11/2018 | Kwon | G05D 1/0246 |
| 2018/0345955 A1* | 12/2018 | Kim | B60W 30/06 |
| 2019/0009773 A1* | 1/2019 | Miyahara | H04N 7/183 |
| 2019/0016331 A1* | 1/2019 | Carlson | B60W 30/06 |
| 2019/0027042 A1* | 1/2019 | Fujishima | B60W 30/06 |
| 2019/0054927 A1* | 2/2019 | Hayakawa | G08G 1/14 |
| 2019/0063947 A1* | 2/2019 | Beaurepaire | G01C 21/3476 |
| 2019/0202447 A1* | 7/2019 | Taniguchi | G05D 1/00 |
| 2019/0232953 A1* | 8/2019 | Suzuki | B60W 30/06 |
| 2019/0291722 A1* | 9/2019 | Maeda | B60R 21/00 |
| 2019/0329761 A1* | 10/2019 | Kim | B62D 15/0285 |
| 2020/0005649 A1* | 1/2020 | Kim | G06K 9/00812 |
| 2020/0041992 A1* | 2/2020 | Nagashima | B60W 50/10 |
| 2020/0062242 A1* | 2/2020 | Hayakawa | B60W 30/06 |
| 2020/0079361 A1* | 3/2020 | Suzuki | B62D 15/027 |
| 2020/0189570 A1* | 6/2020 | Yamanaka | B60W 10/04 |
| 2020/0369204 A1* | 11/2020 | Suzuki | G06K 9/00812 |
| 2020/0406889 A1* | 12/2020 | Yamanaka | B60R 21/00 |
| 2021/0086759 A1* | 3/2021 | Yamanaka | B60R 21/00 |

FOREIGN PATENT DOCUMENTS

| | | |
|---|---|---|
| JP | 2012066709 | 4/2012 |
| JP | 2016199080 | 12/2016 |
| KR | 1020110132348 | 12/2011 |
| KR | 1020160147557 | 12/2016 |

* cited by examiner

1420

AUTONOMOUS PARKING SYSTEM AND VEHICLE

CROSS-REFERENCE TO RELATED APPLICATIONS

This application claims the priority benefit of Korean Patent Application No. 10-2018-0012368, filed on Jan. 31, 2018, in the Korean Intellectual Property Office, the disclosure of which is incorporated herein by reference.

FIELD

The present disclosure relates to an autonomous parking system and a vehicle.

BACKGROUND

A vehicle is an apparatus that may transport a user riding therein. An example of a vehicle may be an automobile.

Recently, there have been efforts to develop a vehicle parking system. For example, it is interest to develop a parking system that may assist a driver in parking and that may autonomously park a vehicle.

In some cases when a target parking space is already set and a parking operation is being performed to park at the target parking space, a parking system may not allow to set a new parking space that has become a more appropriate parking space.

SUMMARY

One object of the present disclosure is to provide an autonomous parking system for searching for a new parking space based on user preference even while a parking operation is being performed into a preset parking space.

Another object of the present disclosure is to provide a vehicle including the autonomous parking system.

Objects of the present disclosure should not be limited to the aforementioned objects and other unmentioned objects will be clearly understood by those skilled in the art from the following description.

According to one aspect of the subject matter described in this application, an autonomous parking system includes an object detection apparatus, and one or more processors. The one or more processors are configured to: perform an initial parking operation for parking a vehicle into a first parking space along a first path, the first path including one or more first turnaround points; during the initial parking operation, detect a second parking space using the object detection apparatus; generate a second path for parking the vehicle into the second parking space; and, in response to user input, perform at least one of a first parking operation along the first path or a second parking operation along the second path.

Implementations according to this aspect may include one or more of the following features. For example, the one or more processors are further configured to detect the second parking space based on at least one of: information on a distance from the second parking space to a final destination of the vehicle; information on a size of the second parking space; information on a duration estimated to complete parking at the second parking space; or information on a distance from the second parking space to the vehicle. In some examples, the one or more processors are further configured to determine one or more second turnaround points included in the second path.

In some implementations, the one or more processors are further configured to determine the one or more second turnaround points based on at least one of: a distance from the vehicle to the second parking space; a direction from the vehicle to the second parking space; or a speed of the vehicle. In some examples, the one or more processors are further configured to, based on a number of the one or more second turnaround points being less than or equal to a reference value, perform the second parking operation along the second path in response to user input.

In some implementations, the autonomous parking system further includes a display unit, where the one or more processors are further configured to cause the display unit to display a first graphic object corresponding to the one or more first turnaround points and a second graphic object corresponding to the one or more second turnaround points, the second graphic object being visually different from the first graphic object. In some examples, the one or more processors are further configured to, based on a number of the one or more second turnaround points being less than or equal to a reference value, cause the display unit to display the second graphic object.

In some implementations, the one or more processors are further configured to cause the display unit to display a button configured to receive user input. In some examples, the one or more processors are further configured to, during the first parking operation along the first path, cause the display unit to display a first button configured to receive user input that indicates a change of parking operation to the second parking operation along the second path.

In some implementations, the one or more processors are further configured to deactivate the first button based on the vehicle arriving at the one or more second turnaround points and making a turn at the one or more second turnaround points. In some examples, the one or more processors are further configured to, during the second parking operation along the second path, cause the display unit to display a second button configured to receive user input that indicates a change of parking operation to the first parking operation along the first path.

In some examples, the one or more processors are further configured to deactivate the second button based on the vehicle arriving at the one or more first turnaround points and making a turn at the one or more first turnaround points. In some examples, the one or more processors are further configured to cause the display unit to display a graphic object corresponding to a period of time estimated for the vehicle to arrive at the one or more first turnaround points.

In some implementations, the one or more processors are further configured to determine the one or more second turnaround points that are farther from the vehicle than the one or more first turnaround points. In some instances, the one or more processors are further configured to generate a control signal to: control the vehicle to travel to the one or more first turnaround points at a first variation of speed; and, based on the vehicle passing the one or more first turnaround points, control the vehicle to travel from the one or more first turnaround points at a second variation of speed, the second variation of speed being different from the first variation of speed.

In some examples, the one or more processors are further configured to generate the control signal to: decelerate the vehicle before the vehicle passes the one or more first turnaround points; and based on the vehicle passing the one or more first turnaround points, accelerate the vehicle and then decelerate the vehicle.

In some implementations, the one or more processors are further configured to: cause the display unit to display a first graphic image corresponding to the first path; cause the display unit to display a second graphic image corresponding to the second path, the second graphic image being visually different from the first graphic image; cause the display unit to display a first button configured to receive user input indicating a change of parking operation to the second parking operation along the second path; and, in response to reception of user input at the first button, generate a control signal for parking the vehicle along the second path.

In some implementations, the one or more processors are further configured to: cause the display unit to display a first graphic image corresponding to the first path; cause the display unit to display a second graphic image corresponding to the second path, the second graphic image being visually different from the first graphic image; perform the second parking operation for parking the vehicle into the second parking space along the second path; cause the display unit to display a second button indicating a change of parking operation to the first parking operation along the first path; and, in response to reception of user input at the second button, generate a control signal for parking the vehicle along the first path.

In some examples, the one or more processors are further configured to cause the display unit to display a graphic object corresponding to a period of time estimated for the vehicle to arrive at the one or more second turnaround points.

According to another aspect, a vehicle includes one or more wheels configured to be driven based on a control signal provided from an autonomous parking system. The autonomous parking system includes an object detection apparatus, and one or more processors. The one or more processor are configured to: perform an initial parking operation for parking the vehicle into a first parking space along a first path, the first path including one or more first turnaround points; during the initial parking operation, detect a second parking space using the object detection apparatus; generate a second path for parking the vehicle into the second parking space; and, based on user input, perform at least one of a first parking operation along the first path or a second parking operation along the second path.

Implementations according to this aspect may include one or more features of the autonomous parking system described above.

The details of other implementations are included in the following description and the accompanying drawings.

The implementations of the present disclosure have one or more effects as follows.

First, if a parking space having higher user preference is now available during a parking operation into a preset parking space, a vehicle is parked in the new parking space, thereby increasing user convenience.

Second, a parking path is selected based on a turnaround point, thereby reducing a time required for parking.

Effects of the present disclosure should not be limited to the aforementioned effects and other unmentioned effects will be clearly understood by those skilled in the art from the claims.

BRIEF DESCRIPTION OF THE DRAWINGS

The implementations will be described in detail with reference to the following drawings in which like reference numerals refer to like elements.

DETAILED DESCRIPTION

A vehicle as described in this specification may include, but be not limited to, an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
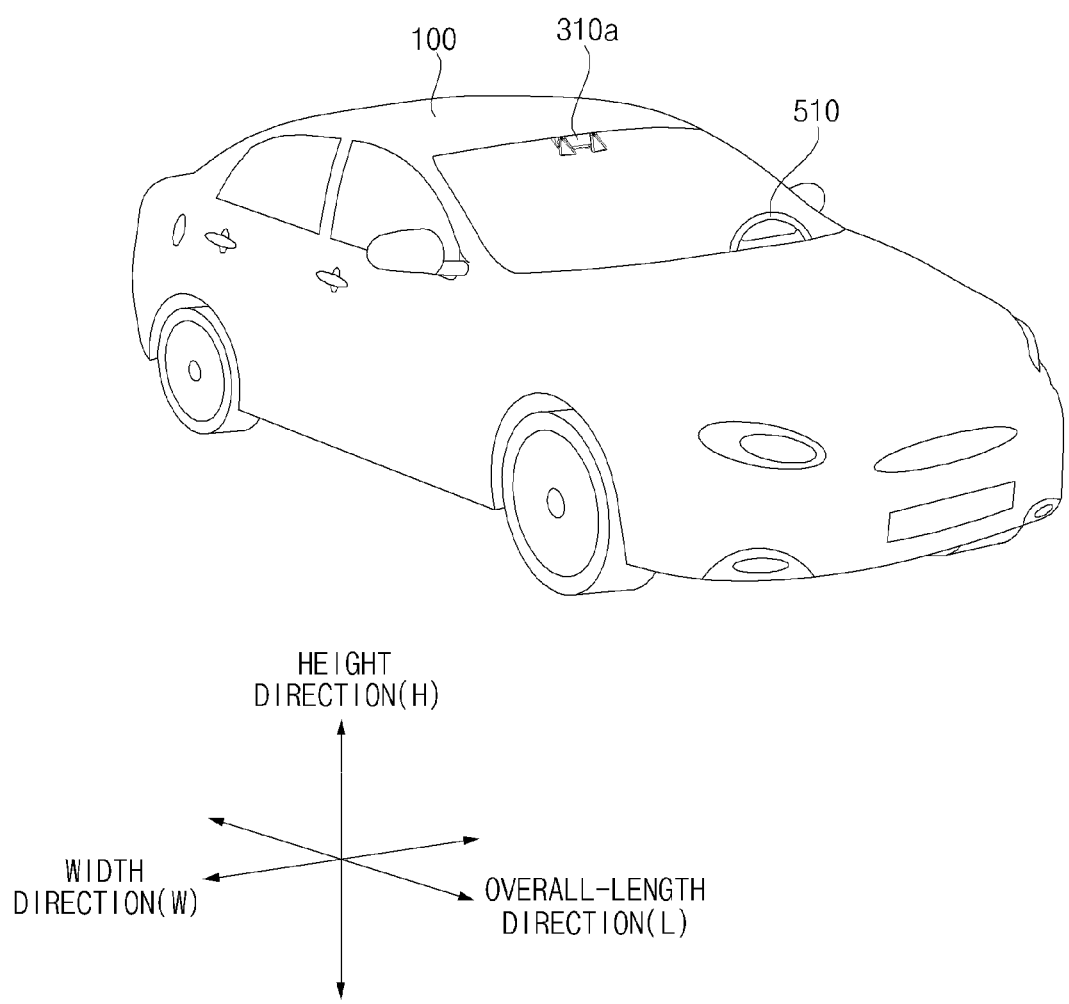
FIG. 1 is a view showing an example external appearance of an example vehicle.

FIG. 1 illustrates an example external appearance of an example vehicle.

Figure 2:
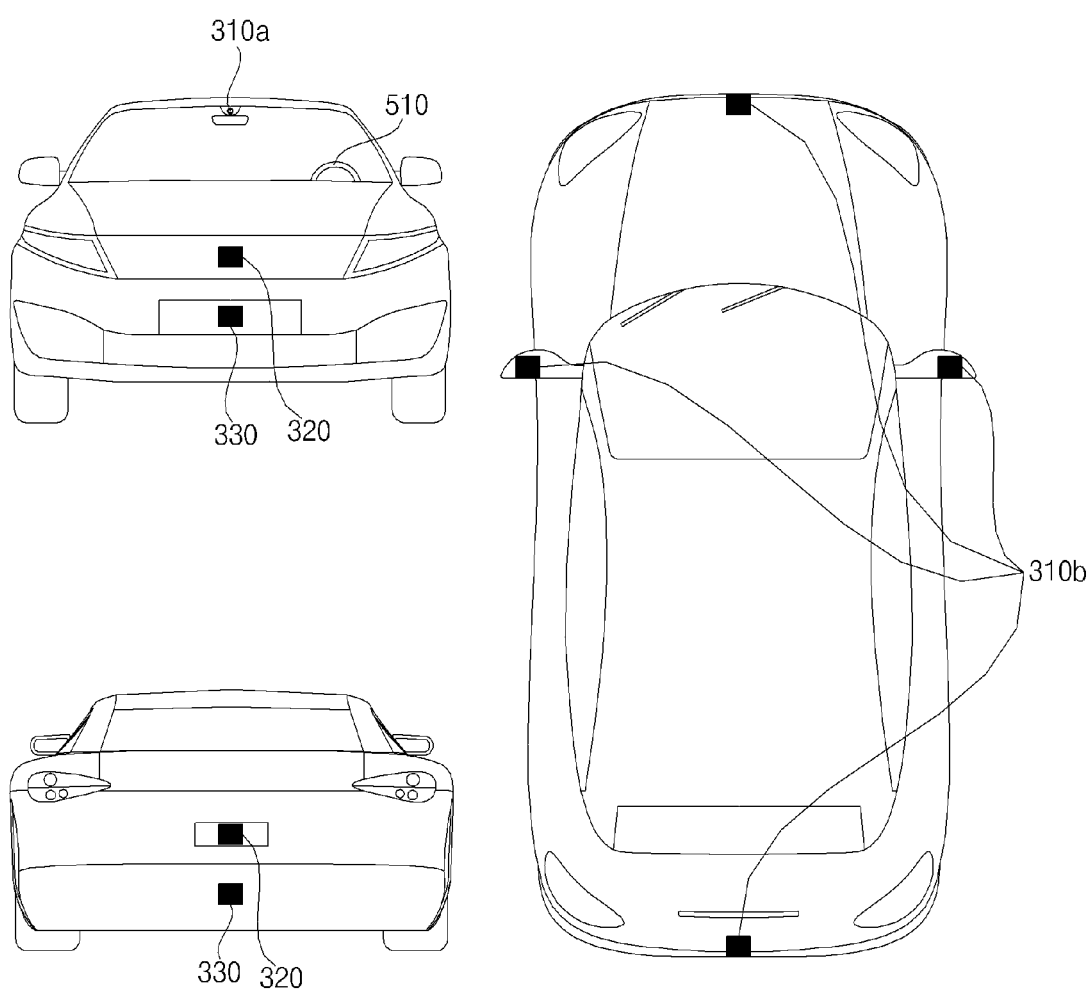
FIG. 2 is different angled views showing an example vehicle.

FIG. 2 is different angled views showing an example vehicle.

Figure 3:
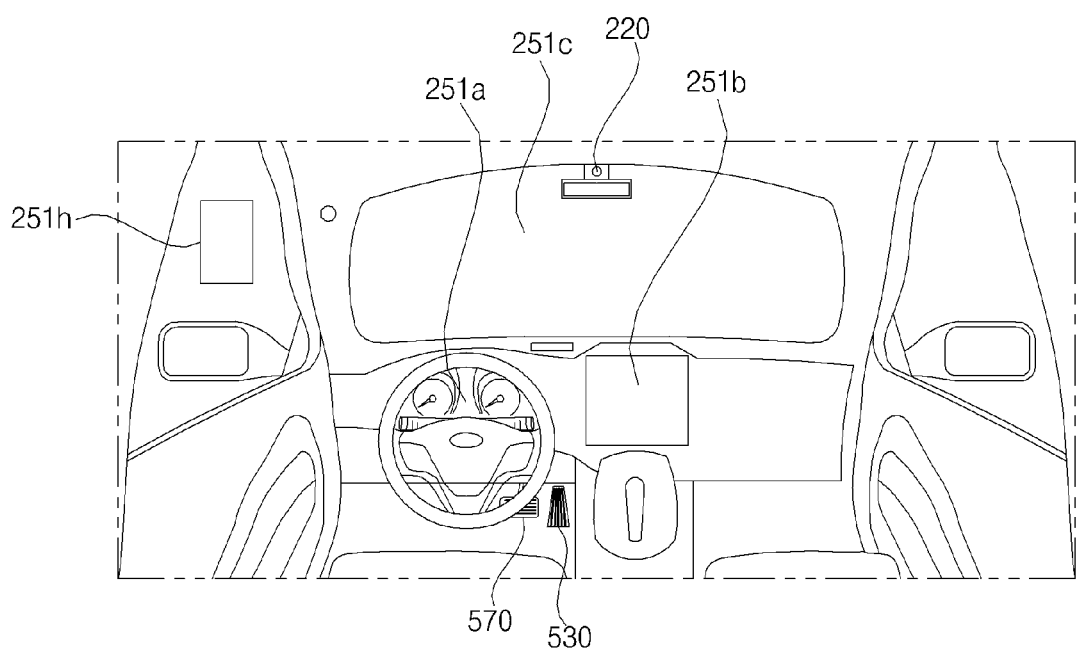
FIGS. 3 and 4 are views showing example internal configurations of an example vehicle.
Figure 4:
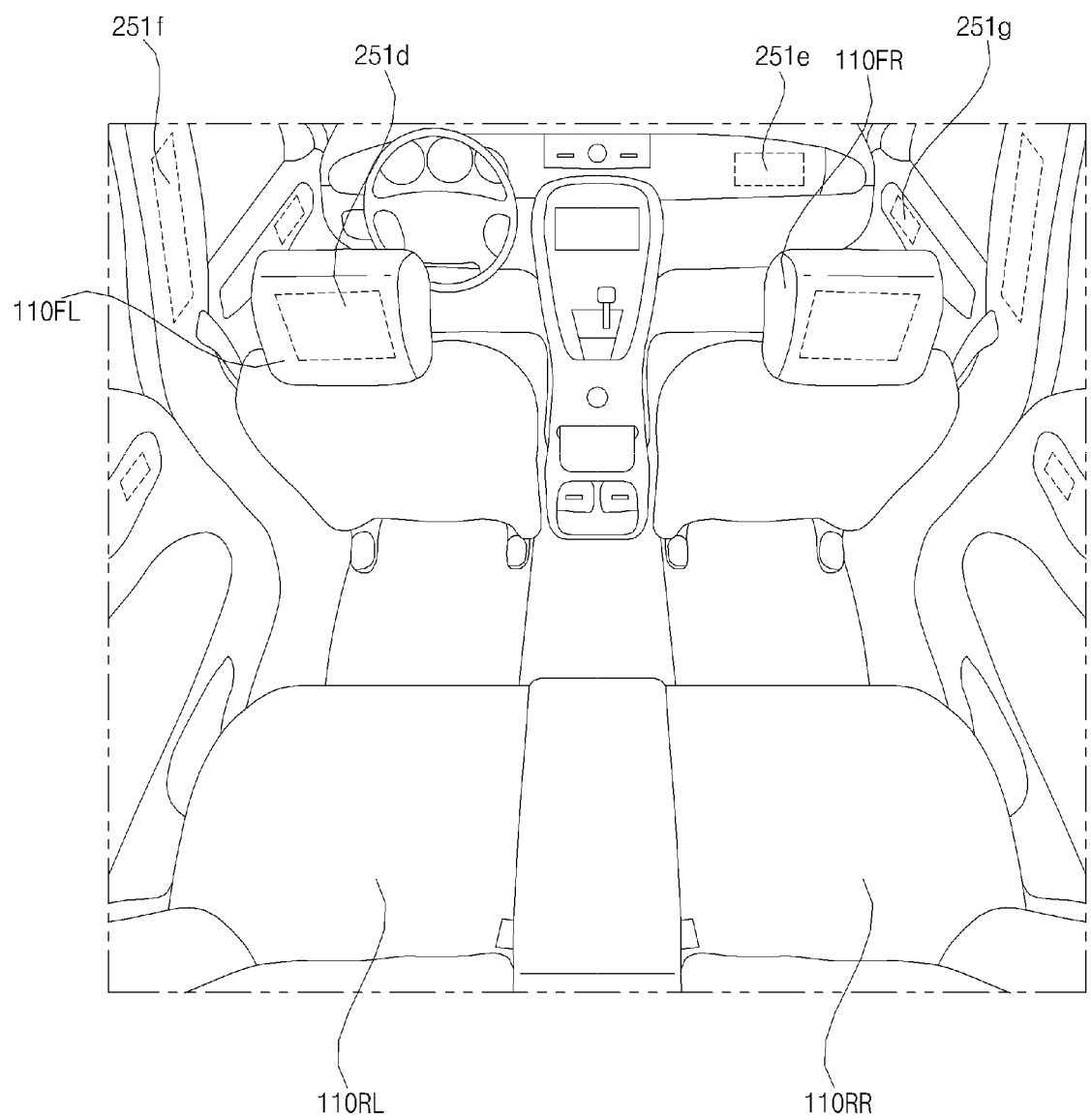

FIGS. 3 and 4 illustrate example internal configurations of an example vehicle.

Figure 5:
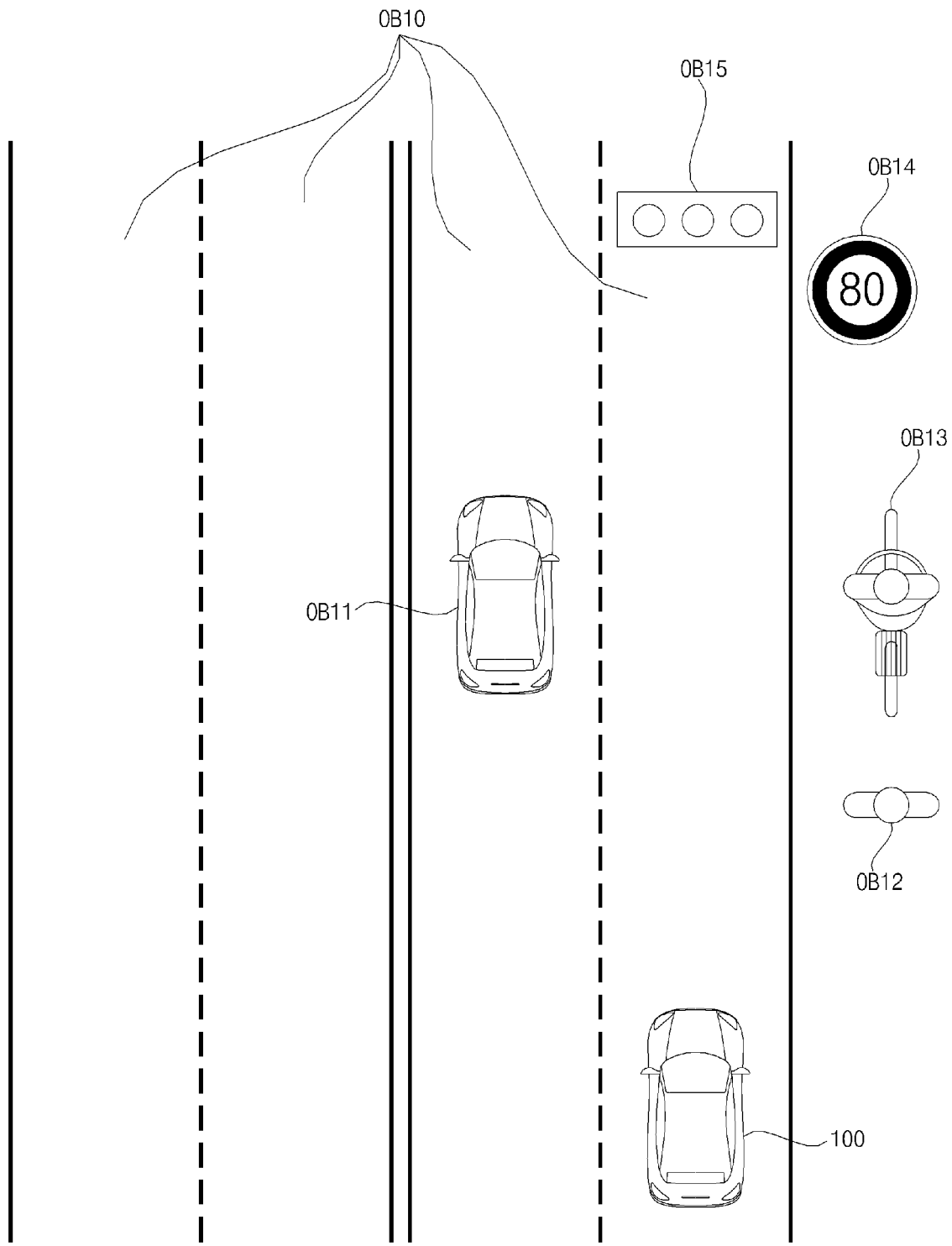
FIGS. 5 and 6 are views showing example objects around an example vehicle.
Figure 6:
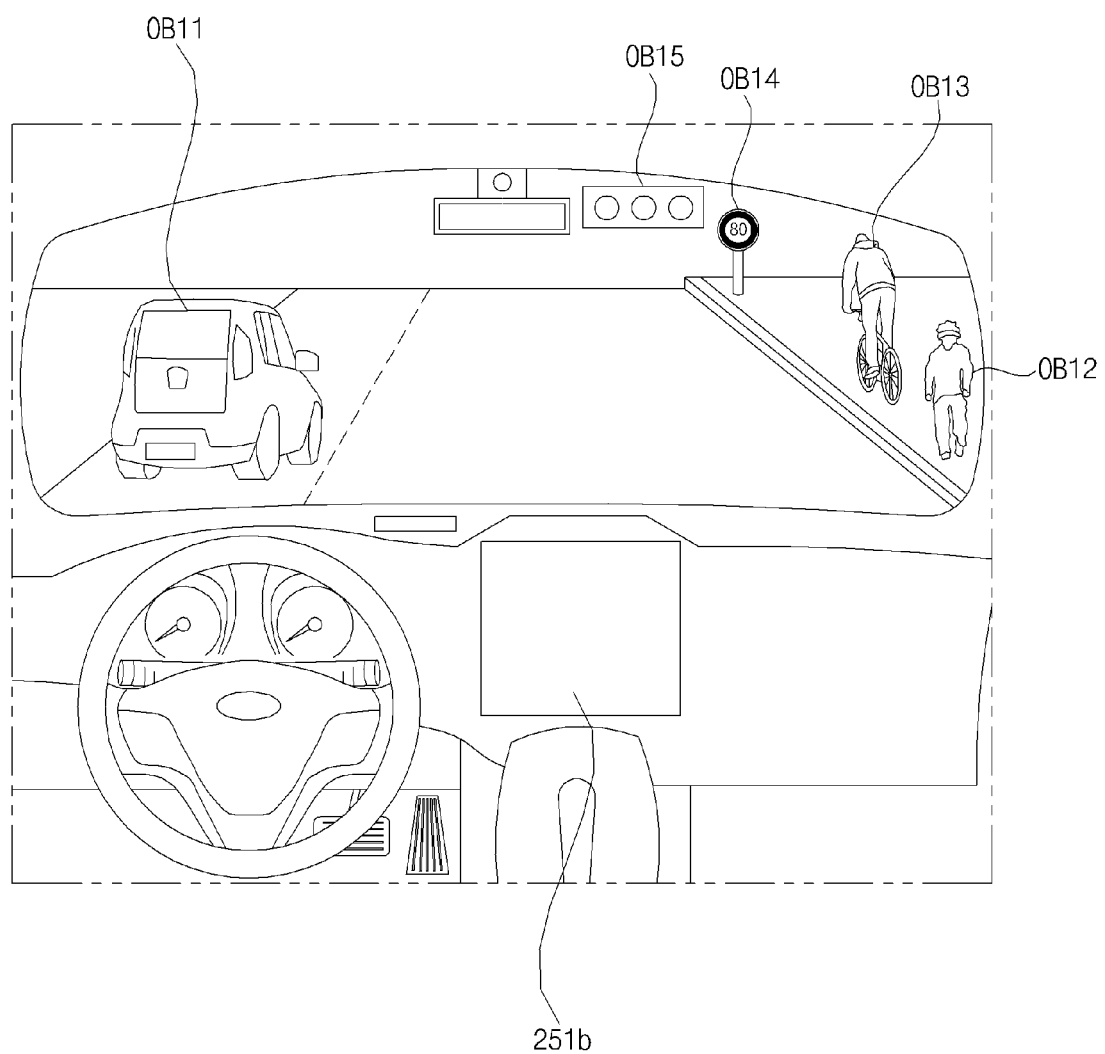

FIGS. 5 and 6 illustrate example objects around an example vehicle.

Figure 7:
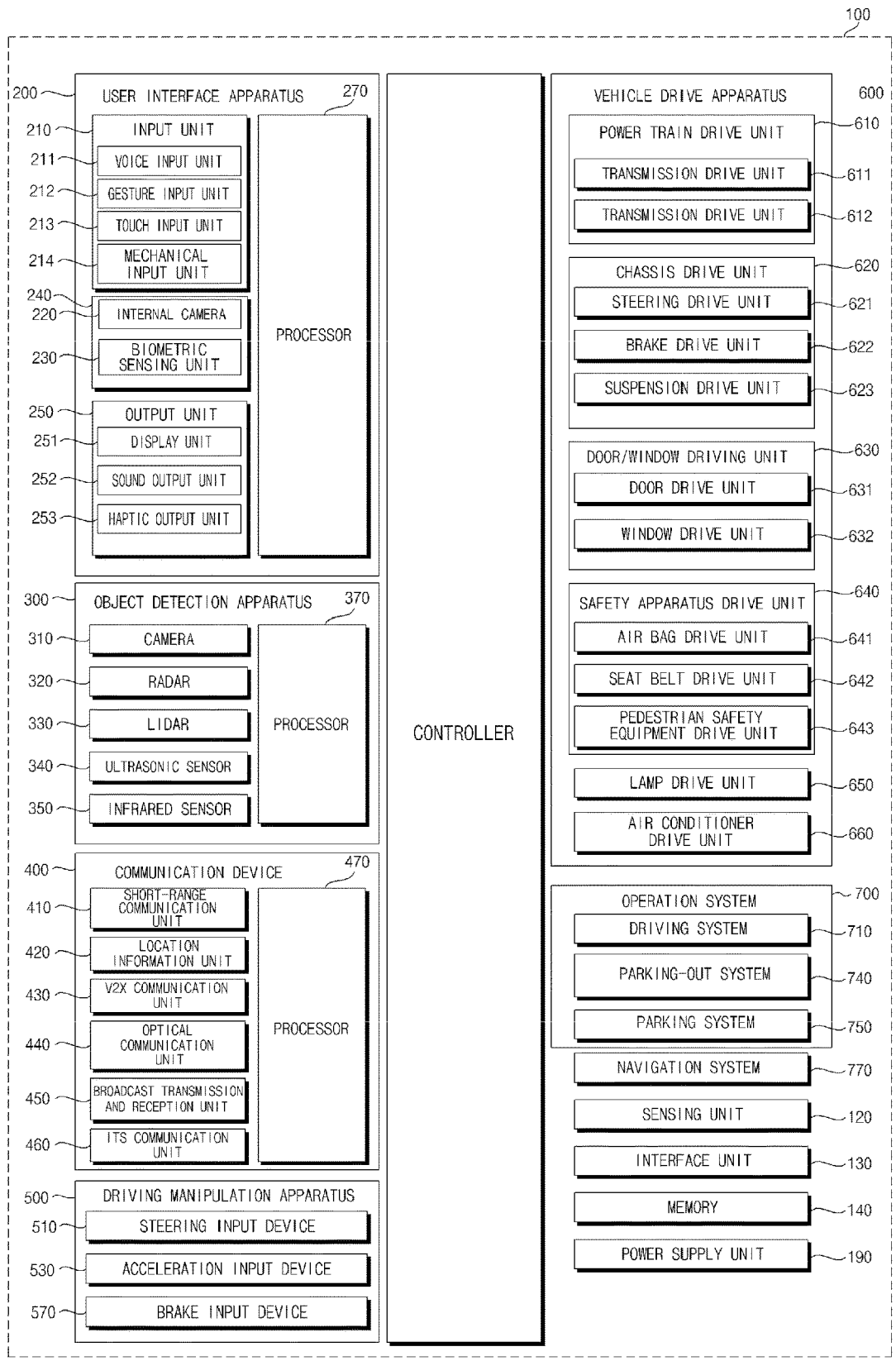
FIG. 7 is a block diagram illustrating an example vehicle.

FIG. 7 is a block diagram illustrating an example vehicle.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may switch to an autonomous driving mode or a manual mode in response to a user input.

For example, in response to a user input received through a user interface apparatus 200, the vehicle 100 may switch from a manual mode to an autonomous driving mode, or vice versa.

The vehicle 100 may switch to the autonomous driving mode or to the manual mode based on driving situation information.

The driving situation information may include at least one of the following: information on an object located outside the vehicle 100, navigation information, or vehicle state information.

For example, the vehicle 100 may switch from the manual mode to the autonomous driving mode, or vice versa, based on driving situation information generated by the object detection apparatus 300.

For example, the vehicle 100 may switch from the manual mode to the autonomous driving mode, or vice versa, based on driving situation information received through a communication apparatus 400.

The vehicle 100 may switch from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500. In response to the user input received through the driving manipulation apparatus 500, the vehicle 100 may operate.

The term "overall length" means the length from the front end to the rear end of the vehicle 100, the term "overall width" means the width of the vehicle 100, and the term "overall height" means the height from the bottom of the wheel to the roof.

In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor or an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, or a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, or a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, or an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a preset screen with a preset transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, or a transparent Light Emitting Diode (LED) display. The transparency of the transparent display may be adjustable.

In some examples, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or a processor of a different device inside the vehicle 100.

In some examples, the user interface apparatus 200 may be referred to as a display device for vehicle.

The user interface apparatus 200 may operate under control of the controller 170.

The object detection apparatus 300 is configured to detect an object outside the vehicle 100. The object detection apparatus 300 may generate information on the object based on sensing data.

The information on the object may include information about the presence of the object, location information of the object, information on a distance between the vehicle 100 and the object, and information on a speed of movement of the vehicle 100 relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane may be a concept including an intersection.

The nearby vehicle OB11 may be a vehicle that is travelling in the vicinity of the vehicle 100. The nearby vehicle OB11 may be a vehicle within a preset distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a preset distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a preset distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, a bridge, a curb, and a wall surface.

The geographical feature may include a mountain and a hill.

In some examples, the object may be classified as a movable object or a stationary object. For example, the movable object may be a concept including a moving nearby vehicle and a moving pedestrian. For example, the stationary object may be a concept including a traffic signal, a road, a structure, a stopped nearby vehicle, and a stopped pedestrian.

The object detection apparatus 300 may include a camera 310, a radar 320, a lidar 330, an ultrasonic sensor 340, an infrared sensor 350, and a processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by using a pin hole model or profiling a road surface.

For example, the camera 310 may acquire the information on a distance to the object and the information on the speed relative to the object, based on information on disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one side window inside the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a preset distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

For example, the processor 370 may acquire information on the distance to the object or information on the speed relative to the object by using a pin hole model or by profiling a road surface.

For example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or a processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, or an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, or Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

In some examples, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some examples, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some examples, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some examples, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some examples, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle drive device 600 may include its own processor.

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

In some examples, the vehicle travel system 700 may include a processor. Each unit of the vehicle travel system 700 may include its own processor.

In some examples, in some implementations, in the case where the vehicle travel system 700 is implemented as software, the vehicle travel system 700 may be a subordinate concept of the controller 170.

In some examples, in some implementations, the vehicle travel system 700 may be a concept including at least one selected from among the user interface apparatus 200, the object detection apparatus 300, the communication apparatus 400, the driving manipulation apparatus 500, the vehicle drive apparatus 600, the navigation system 770, the sensing unit 120, or the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The driving system 710 may be a system which includes at least one of the user interface apparatus 200, the object detection apparatus 300, the communication apparatus 400, the driving manipulation apparatus 500, the vehicle driving device 600, the navigation system 770, the sensing unit 120, or the controller 170 so as to perform driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 200, the object detection apparatus 300, the communication apparatus 400, the driving manipulation apparatus 500, the vehicle driving device 600, the navigation system 770, the sensing unit 120, or the controller 170 so as to perform an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The parking system 750 may be a system which includes at least one of the user interface apparatus 200, the object detection apparatus 300, the communication apparatus 400, the driving manipulation apparatus 500, the vehicle driving device 600, the navigation system 770, the sensing unit 120, or the controller 170 so as to perform an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, or information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an Inertial Navigation Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, a brake pedal position sensor, etc.

In some examples, the IMU sensor may include at least one of an accelerometer, a gyro sensor, or a magnetic sensor.

The sensing unit 120 may acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some examples, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or electric units for the implementation of other functions.

In some examples, the plurality of wheels in the vehicle 100 may be driven based on a control signal from the autonomous parking system 750.

Figure 8:
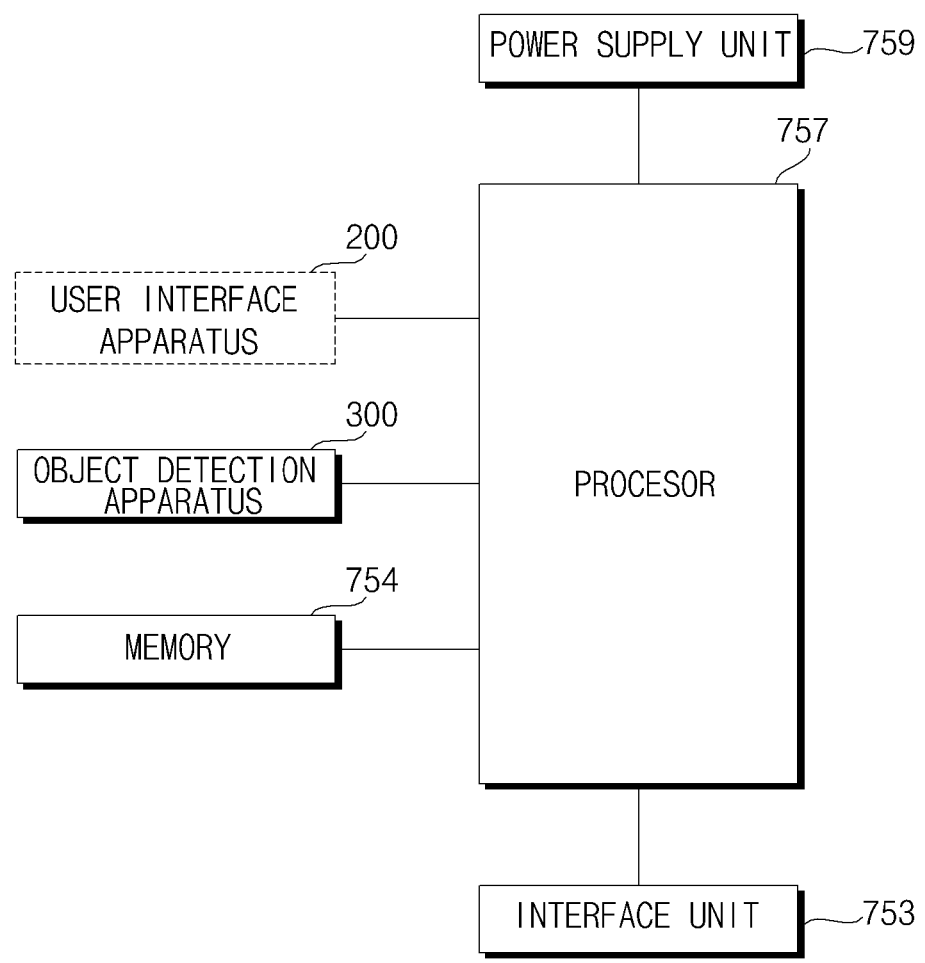
FIG. 8 is a block diagram illustrating an example autonomous parking system.

FIG. 8 is a block diagram illustrating an example autonomous parking system.

Description of the parking system 750 explained above may be applied to an autonomous parking system 750 shown in FIG. 8.

The autonomous parking system 750 may be referred to as an autonomous parking control apparatus, an autonomous parking apparatus, or the like.

Referring to FIG. 8, the autonomous parking system 750 may include an object detection apparatus, a memory 754, an interface unit 753, a processor 757, and a power supply unit 759.

In some implementations, the autonomous parking system 750 may further include a user interface apparatus 200.

The user interface apparatus 200 may function as a Human Machine Interface (HMI) for communication between the autonomous parking system 750 and a user.

The user interface apparatus 200 may receive a user input. The user input may be a user input for parking in a parking available space.

For example, the user interface apparatus 200 may receive a user input that is intended to select at least one of a parking space or a parking path.

The user interface apparatus 200 may receive a user input based on at least one of a voice input, a gesture input, a touch input, or a mechanic input.

The user interface apparatus 200 may transmit, to the processor 757, a signal corresponding to the received user input.

Description about the user interface apparatus 200 explained above with reference to FIGS. 1 to 7 may be applied to the user interface apparatus 200 shown in FIG. 8.

As described above, the user interface apparatus 200 may include an input unit 210, an output unit 250, and a processor 270.

The input unit 210 may include at least one of a voice input unit 211, a gesture input unit 212, a touch input unit 213, or a mechanical input unit 214.

The output unit 250 may include at least one of a display unit 251, a sound output unit 252, or a haptic output unit 253.

The object detection apparatus 300 may detect an object located outside a vehicle, and generate information about the object.

The object detection apparatus 300 may detect a parking space using at least one of a camera 310, a radar 320, a lidar 330, an ultrasonic sensor 340, or an infrared sensor 350, and generate information about the detected parking space.

The object detection apparatus 300 may transmit the information about the detected parking space to the processor 757.

Description about the object detection apparatus 300 explained above with reference to FIGS. 1 to 8 may be applied to the object detection apparatus 300 shown in FIG. 8.

The memory 754 may store various types of data, such as programs for processing or controlling the processor 757, which are required for overall operation of the parking system 750. The memory may be any of various hardware storage devices, such as ROMs, RAMS, EPROMs, flash drives, hard drives, etc.

The memory 756 may be a volatile memory. For example, the memory 756 may be an SRAM.

The memory 754 may be integrally formed with the processor 757 or may be separate from the processor 757.

The interface unit 753 may act as a channel to exchange data with other devices inside the vehicle 100.

The interface unit 753 may receive data from an electrically connected unit, and transmit signal processed or generated by the processor to an electrically connected unit.

The interface unit 753 may transmit received information, data, or signal to the processor 757. The interface unit 753 may transmit information, data, or a signal generated or processed by the processor 757 to a different device included in the vehicle 100.

In particular, the interface unit 753 may exchange data with the vehicle drive apparatus 600 and the sensing unit 120.

The processor 757 may control overall operation of each unit included in the autonomous parking system 750.

The processor 757 may be implemented by using at least one of the following: Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or electric units for the implementation of other functions.

The processor 757 may receive information about an object from the object detection apparatus 300.

For example, the processor 757 may receive information about a nearby vehicle and a structure from the object detection apparatus 300.

In some examples, information about an object may be information based on data acquired by one or more of the camera 310, the radar 320, the lidar 330, the ultrasonic sensor 340, and the infrared sensor 350.

The processor 757 may determine a turnaround point.

The processor 757 may determine a turnaround point based on information provided from the object detection apparatus 300 and information provided from the sensing unit 120.

The processor 757 may determine a turnaround point based on a user input provided from the user interface apparatus 200.

The turnaround point may be defined as a point at which the forward direction of travel of the vehicle is switched into the backward direction, or vice versa.

For example, the turnaround point may be a point at which forward traveling of the vehicle 100 is switched into backward traveling.

For example, the turnaround point may be a point at which backward traveling of the vehicle 100 is switched into forward traveling.

The processor 757 may perform a parking operation into a first parking space according to a preset first path.

The first path may include at least one first turnaround point.

A first turnaround point may be determined by the processor based on information provided from the object detection apparatus 300 and information provided from the sensing unit 120.

While performing a parking operation into a first parking space along a first path, the processor 757 may detect a second parking space using the object detection apparatus 300.

The second parking space may be defined as a parking space having user preference higher than that of the first parking space.

While performing a parking operation along a first path, the processor 757 may detect the second parking space based on user preference.

Using at least one of information provided from the object detection apparatus 300 or information received from the sensing unit 120, the processor 757 may detect a parking space based on user preference.

For example, while performing a parking operation along the first path, the processor 757 may detect a second parking space based on information on a distance from a parking space to a final destination. A distance from the second parking space to the final destination may be shorter than a distance from the first parking space to the final destination. The final destination is set by a driver of the vehicle. The final destination may be defined as the driver's final destination.

For example, while performing a parking operation along the first path, the processor 757 may detect a second parking space based on information about a space where an occupant exits the vehicle. The second parking space may be larger than the first parking space.

For example, while performing a parking operation along the first path, the processor may detect a second space based on information on a time required for parking. Parking in the second parking space may require a shorter time than parking in the first parking space.

For example, while performing a parking operation along the first path, the processor 757 may detect a second parking space based on information on a distance from a parking space to the vehicle 100. A distance from the second parking space to the vehicle 100 may be shorter than a distance from the first parking space to the vehicle 100.

The processor 757 may generate a second path for parking in a second parking space.

The processor 757 may generate a second parking path for parking the vehicle 100 in a second parking space, based on at least one of information provided from the object detection apparatus 300 or information received from the sensing unit 120.

The processor 757 may generate a second path to control the vehicle 100 to pass a first turnaround point.

The processor may determine at least one second turnaround point included in the second path.

The second turnaround point may be determined by the processor 757 based on information provided from the object detection apparatus 300 and information provided from the sensing unit 120.

The processor 757 may determine a second turnaround point based on a relative relationship between the vehicle 100 and the second parking space.

For example, the processor 757 may determine a second turnaround point based on at least one of a distance relationship between the vehicle 100 and the second parking space, an alignment relationship between the vehicle 100 and the second parking space, or a relative speed relationship between the vehicle 100 and the second parking space.

The distance relationship between the vehicle 100 and the second parking space may be based on at least one of a distance in the overall-width direction or a distance in the overall-length direction.

The alignment relationship between the vehicle 100 and the second parking space may be based on at least one of a heading angle of the vehicle 100 or a direction in which the second parking space is aliened.

The relative speed relationship between the vehicle 100 and the second parking space may be based on a speed of the vehicle 100.

In some implementations, the processor 757 may select a path based on the number of second turnaround points which has been determined.

For example, when the number of second turnaround points is equal to or smaller than a reference value, the processor 757 may park the vehicle 100 along the second path based on a user input.

The processor 757 may display, on the display unit 251, a graphic image corresponding to the first path.

The processor 757 may display, on the display unit 251, a graphic image corresponding to the second path.

The processor 757 may display the graphic image corresponding to the first path and the graphic image corresponding to the second path to be visually distinguishable from each other.

For example, the processor 757 may display at least one of a shape, a color, or a transparency level of a graphic object corresponding to the second path to be distinguishable from a graphic object corresponding to the first path.

The processor 757 may display a first graphic object corresponding to a first turnaround point.

The processor 757 may display a second graphic object corresponding to a second turnaround point.

The processor 757 may display the first graphic object and a second graphic object to be visually distinguishable from each other.

For example, the processor 757 may display at least one of a shape, a color, or a transparency level of the second graphic object to be distinguishable from the first graphic object.

In some examples, the processor 757 may determine whether to display the second graphic object, based on the number of second turnaround points which has been determined.

For example, only when the number of second turnaround points which has been determined is equal to or smaller than a reference value, the processor 757 may display the second graphic object on the display unit 251.

The processor 757 may receive a user input via the user interface apparatus 200.

For example, the processor 757 may receive at least one of a voice input, a gesture input, a touch input, or a mechanic input via the user interface apparatus 200.

The processor 757 may perform a parking operation based on a user input according to at least one of the first path or the second path.

The processor 757 may generate a control signal for parking.

The processor 757 may provide the generated control signal to a vehicle drive device 600 via an interface unit 753.

The processor 757 may display, on the display unit 251, a soft button for receiving a user input.

The processor 757 may display a first soft button on the display unit 251.

For example, while the vehicle 100 is being parked along the first path, the processor 757 may display the first soft button on the display unit 251.

The first soft button may be defined as a button for receiving a user input for changing to the second path during the parking operation along the first path.

If a user's touch input on the first soft button is received, the processor 757 may generate a control signal for parking along the second path.

If the user's touch input on the first soft button is not received, the processor 757 may generate a control signal for continuously performing the parking operation along the first path.

When the vehicle 100 reaches at least one first turnaround point and then makes a turnaround at the at least one first turnaround point, the processor 757 may deactivate the first soft button.

In some implementations, after the vehicle 100 reaches at least one first turnaround point, the processor 757 may generate a control signal for controlling the vehicle 100 to be stopped for a preset period of time before making a turn-around.

The processor 757 may display a second soft button on the display unit 251.

For example, during a parking operation of the vehicle 100 along the second path, the processor 757 may display a second soft button on the display unit.

The second soft button may be defined as a button for receiving a user input for change to the first path during a parking operation along the second path.

If a user's touch input on the second soft button is received, the processor 757 may generate a control signal to perform a parking operation along the first path.

If a user's touch input on the second soft button is not received, the processor 757 may generate a control signal for continuously performing the parking operation along the second path.

After the vehicle 100 reaches at least one first turnaround point and then makes a turnaround at the at least one first turnaround point, the processor 757 may deactivate the second soft button.

The processor 757 may display, on the display unit 251, a graphic object indicating a time when the vehicle 100 reaches a first turnaround point.

In some implementations, after the vehicle 100 reaches at least one first turnaround point, the processor 757 may generate a control signal for controlling the vehicle 100 to be stopped for a preset period of time before making a turn-around. While being stopped, the processor 757 may receive a user input.

Before the vehicle 100 reaches a first turnaround point, the processor 757 may change a path upon a user input.

For example, during performing a parking operation along the first path, a user may apply an input to change to the second path until the vehicle 100 reaches the first turnaround point.

For example, during a parking operation along the second path, a user may apply an input to change to a first path until the vehicle 100 reaches a first turnaround point.

The processor 757 may determine a second turnaround point to be at a point farther from the vehicle 100 than the first turnaround point.

When the processor 757 performs the parking operation along the second path, the vehicle 100 may reach a second turnaround point via a first turnaround point.

The processor 757 may generate a control signal, so that a variation of speed before the vehicle 100 passes the first turnaround point and a variation of speed after the vehicle 100 passes the first turnaround point to be different from each other.

For example before passing the first turnaround point, the processor 757 may generate a control signal so as to control the vehicle 100 to decelerate. In this case, after the vehicle 100 passes the first turnaround point, the processor 757 may generate a control signal so as to control the vehicle 100 to accelerate and then decelerate.

The power supply unit 759 may supply power required for operation of each unit by control of the processor 757. In particular, the power supply unit 759 may receive power from a battery or the like in the vehicle 100.

Figure 9:
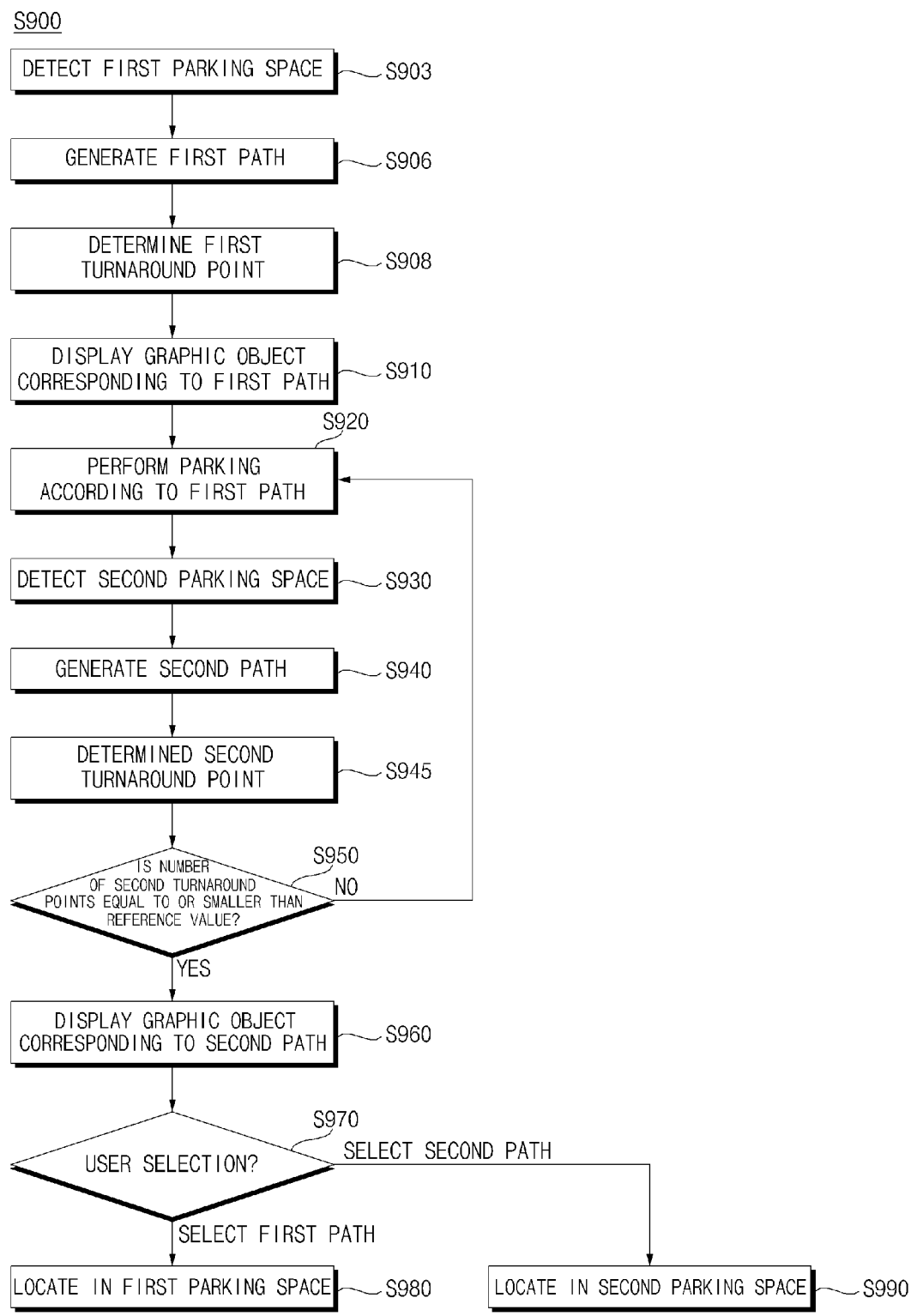
FIG. 9 is a flowchart illustrating an example autonomous parking system.

FIG. 9 is a flowchart illustrating an example autonomous parking system.

An operation 900 exemplarily illustrated in FIG. 9 may be performed by the processor 757.

The processor 757 may detect a first parking space in S903.

The processor 757 may detect a first parking space based on at least one of information received from the object detection apparatus 300 or information received from the sensing unit 120.

The processor 757 may generate a first for parking the vehicle 100 in the parking space in S906.

The first path may be defined as a route required for the vehicle 100 to move into the first parking space from the current location of the vehicle 100.

The processor 757 may determine at least one turnaround point included in the first path in S908.

The processor 757 may display, on the display unit 251, a graphic object corresponding to the first path in S910.

The processor 757 may display a first graphic object corresponding to a first turn-around point. The first graphic object may be displayed on a graphic corresponding to the first path.

The processor 757 may generate a control signal for controlling the vehicle 100 to be parked along the first path in S920.

During the parking operation into the first parking space along the first path, the processor 757 may detect a second parking space in s930.

The processor 757 may detect a second parking space based on user preference.

For example, the processor 757 may detect a second parking space based on at least one of the following: information on a distance from a parking space to a final destination, information on a space where an occupant gets off the vehicle 100, information on a time required for parking, or information on a distance from a parking space to a vehicle.

The processor 757 may generate a second path for parking the vehicle 100 in the second parking space in S940.

The second path may be defined as a route required for the vehicle 100 to move into the second parking space from the current location of the vehicle 100 in a parking lot.

The processor 757 may determine at least one second turnaround point included in the second path in S945.

The processor 757 may determine whether the number of second turnaround points is equal to or smaller than a reference value in S950.

When the number of second turnaround points is equal to or smaller than the reference value, the processor 757 may display a graphic image corresponding to the second path in S960. In this case, the processor 757 may display, on the display unit 251, the graphic image corresponding to the second path to be visually distinguishable from a graphic image corresponding to the first path. For example, the processor 757 may display at least one of a shape, a color, or a transparence level of the graphic image corresponding to the second path to be distinguishable from the graphic image corresponding to the first path.

The processor 757 may display a second graphic object corresponding to a turnaround point. The second graphic object may be displayed on the graphic object corresponding to the second path.

When the number of second turnaround points is greater than the reference value, the processor 757 does not display the graphic object corresponding to the second path and instead may perform a parking operation along the first path.

The processor 757 may perform a parking operation into a first parking space in S980 upon a user's selection of the first path in S970.

While a second parking space is detected, the processor 757 may perform a parking operation along the second path.

During the parking operation along the second path, the processor 757 may display a second soft button on the display unit 251.

The second soft button may be a button for receiving a user input for changing to a parking operation along the first path.

When a touch input on the second soft button is received, the processor 757 may generate a control signal for performing a parking operation along the first path.

In some examples, a user input may be received through the second soft button until the vehicle 100 makes a turnaround at a first turnaround point.

The processor 757 may perform a parking operation into a second parking space in S990 upon a user's selection of the second path S970.

The processor 757 may perform a parking operation along the first path even in the case where the second parking state is detected.

During the parking operation along the first path, the processor 757 may display a first soft button on the display unit 251.

The first soft button may be a button for receiving a user input for changing to a parking operation along the second path.

When a touch input on the first soft button is received, the processor 757 may generate a control signal for performing a parking operation along the second path.

In some examples, a user input may be received through the first soft button until the vehicle 100 makes a turnaround at the first turnaround point.

Figure 10:
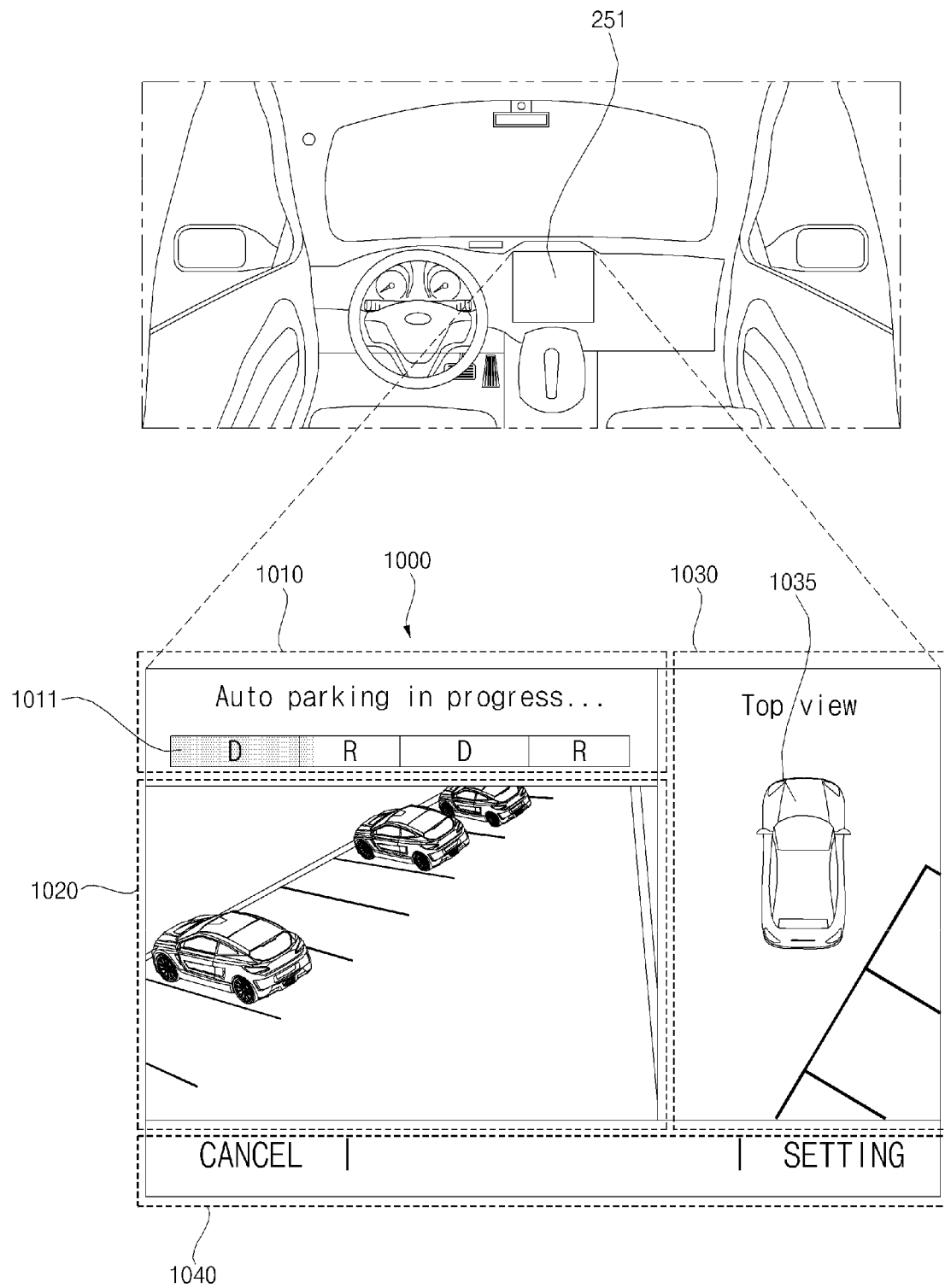
FIG. 10 is a diagram illustrating an example screen of an example display unit.

FIG. 10 is a diagram illustrating an example screen of an example display unit.

Referring to FIG. 10, the display unit 251 may display an autonomous parking screen 1000 by control of the processor 757.

The autonomous parking screen 1000 may include a plurality of areas 1010, 1020, 1030, and 1040.

The processor 717 may control the display unit 251 so that a graphic object corresponding driving situation information is displayed in a first area 1010.

The processor 757 may control the display unit 251 so that a progress bar 1011 divided into a plurality of regions based on turnaround planning information is displayed.

The turnaround planning information may be included in path information.

The turnaround planning information is a concept including at least one of planning information for changing forward traveling into backward traveling or planning information for changing backward traveling into forward traveling.

The processor 757 may control the display unit 251 based on second information so that a color of a progress bar is gradually changed in one direction.

The processor 757 may control the display unit 251 so that an area corresponding to forward travel planning and an area corresponding to backward travel planning are sequentially displayed.

The processor 757 may control the display unit 251 so that an image acquired a camera 310 is displayed in a second area 1020.

For example, the processor 757 may control the display unit 251 so that an image acquired by any one of a mono camera, a stereo camera, an AVM camera, and a 360-degree camera is displayed in the second area 1020.

For example, the processor 757 may control the display unit 251 so that an image acquired by a camera selected by a user from among a plurality of AVM cameras is displayed.

For example, the processor 757 may control the display unit 251 so that an image acquired by a camera selected from among a plurality of AVM cameras based on driving situation information is displayed.

The processor 757 may control the display unit 251 so that an image acquired by the camera 310 is displayed in a third area 1030.

For example, the processor 757 may control the display unit 251 so that an image acquired by any one of a mono camera, a stereo camera, an AVM camera, and a 360-degree camera is processed and then displayed in the third area 1030.

For example, the processor 757 may control the display unit 251 so that an around view image generated by synthesizing images acquired by a plurality of AVM cameras is displayed in the third area 1030.

The processor 757 may display a vehicle image 1035 on the processed image.

In some implementation, the processor 757 may control a graphic object corresponding to first information in the third area 1030.

The processor 757 may control the display unit 251 so that one or more buttons for receiving a user input are displayed in a fourth area 1040.

Some of the first to fourth areas 1010 to 1040 may be omitted. The autonomous parking screen 1000 may further include another area in addition to the first to fourth areas 1010 to 1040.

A position and a size of each of the first to fourth areas 1010 to 1040 are not limited to the example of FIG. 10, but may vary in some implementations.

FIGS. 11A to 11E are diagrams illustrating example operation of an example autonomous parking system.

Figure 11A:
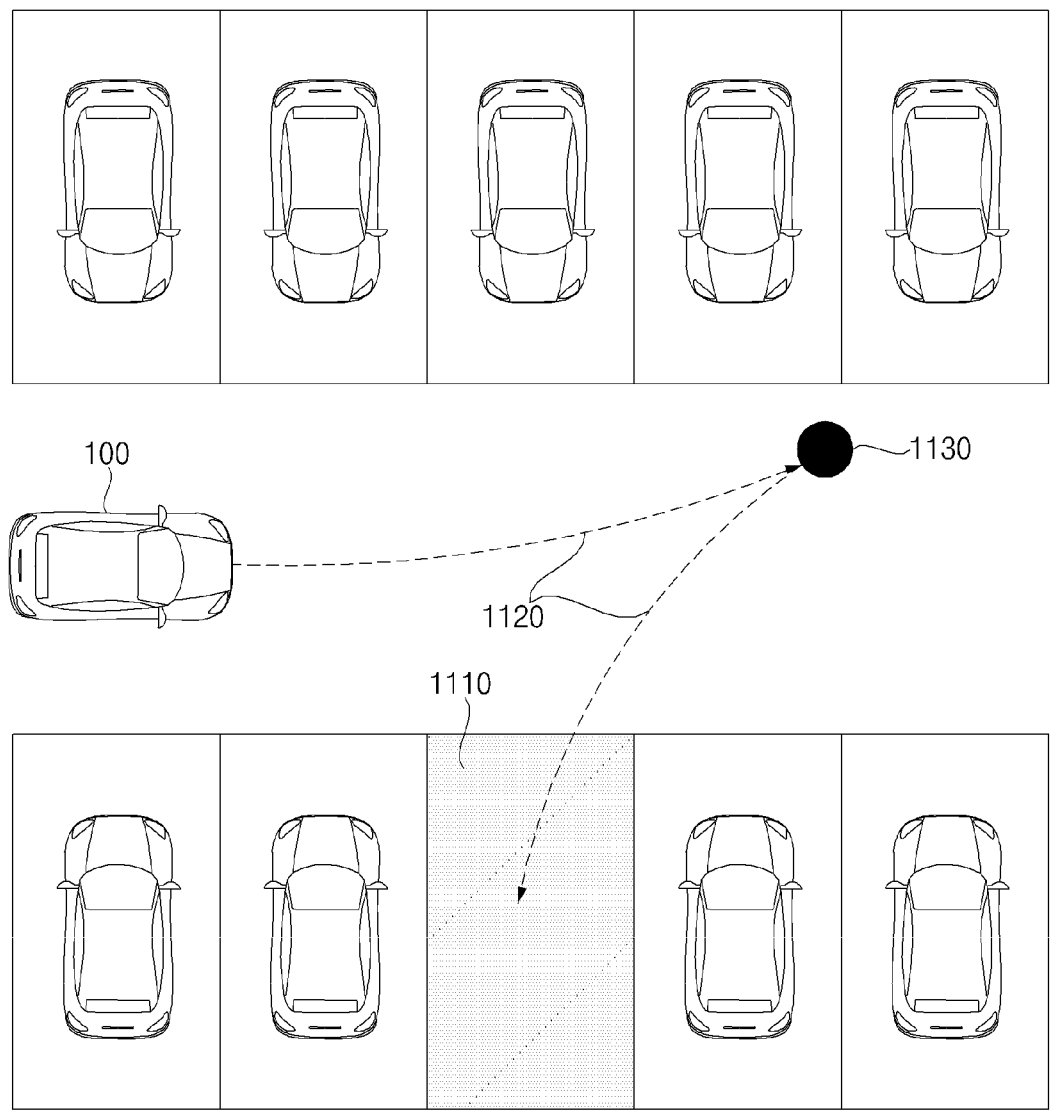
FIGS. 11A to 11E are diagrams illustrating example operation of an example autonomous parking system.

Referring to FIG. 11A, the processor 757 may detect a first parking space 1110.

The processor 757 may generate a first path 1120 for parking the vehicle 100 in the first parking space 1110.

The first path 1120 may be generated based on the first parking space 1110 and ambient object information generated by the object detection apparatus 300.

An ambient object may be a concept including at least one of another vehicle, a pedestrian, a structure (e.g., a pole, a wall face, and a curb), or an object on a road surface (e.g., a parking line and a direction arrow).

The processor 757 may determine at least one first turnaround point 1130.

A first turnaround point 1130 may be included in the first path 1120.

As illustrated in FIG. 11A, in a situation where the vehicle 100 needs to be parked into a first parking space 1110 in reverse, the first turnaround point 1130 may be understood as a point at which forward travelling of the vehicle 100 switches into backward travelling.

The processor 757 may generate a control signal for parking the vehicle 100 into the first parking space 1110 along the first path 1120.

Figure 11B:
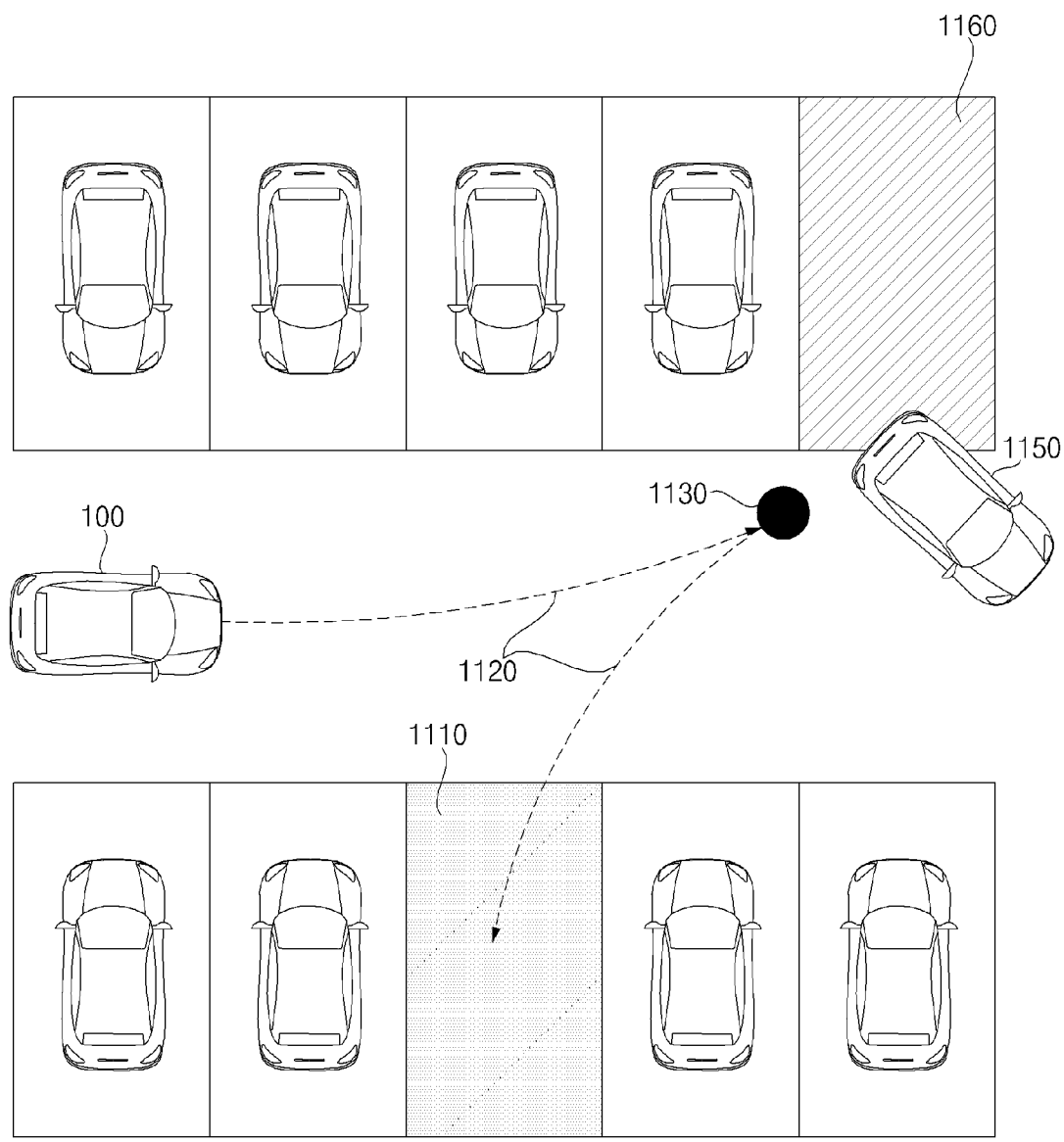

Referring to FIG. 11B, during the parking operation of the vehicle 100 along the first path 1120, a new parking space (i.e., a second parking space 1160) may be available as another vehicle 1150 exits from the second parking space 1160.

Figure 11C:
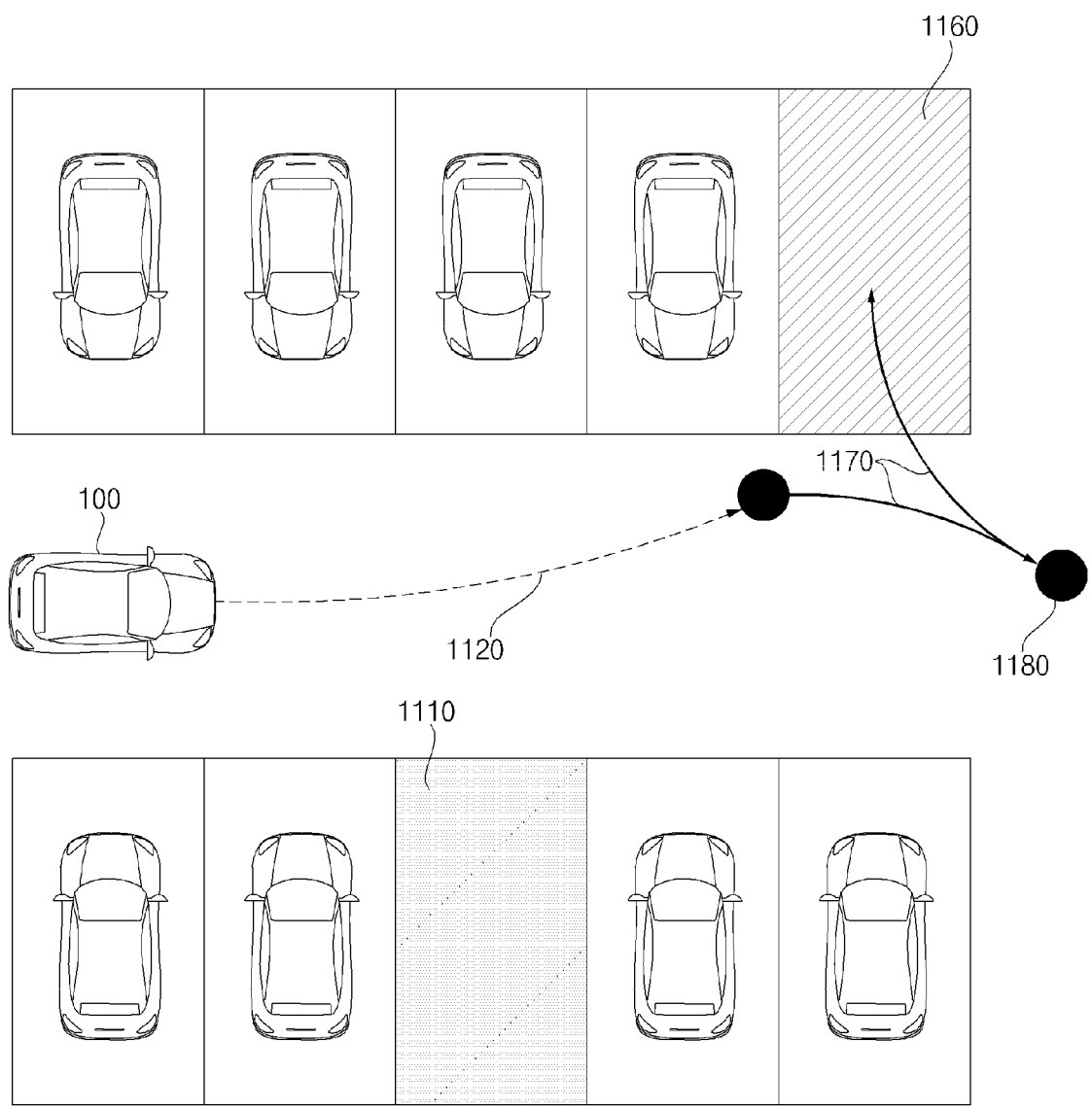

Referring to FIG. 11C, during the parking operation of the vehicle 100 along the first path 1120, the processor 757 may detect a second parking space 1160 based on user preference.

The user preference may be preset and stored in the memory 754.

For example, the memory 754 may store user preference based on accumulated and stored user inputs regarding selection of a parking space.

In some implementations, the user preference may be set based on at least one of the following: information on a distance from a parking space to a final destination, information on a space where an occupant exits, information on a time required for parking, or information on a distance from a parking space to the vehicle 100.

The processor 757 may generate a second path 1170 for parking the vehicle 100 in the second parking space 1160.

The processor 757 may generate the second path 1170 so that the vehicle 100 passes the first turnaround point 1130.

In this case, the processor 757 may use part of the first path 1120, including the first turnaround point 1130, as the second path 1170.

By controlling as above, it is possible to change a parking path while maintaining an existing posture of the vehicle 100, thereby reducing a user's sense of inconsistency.

The second path 1170 may be generated based on the detected second parking space 1160 and ambient object information generated by the object detection apparatus 300.

The processor 757 may determine at least one second turnaround point 1180.

The second turnaround point 1180 may be included in the second path 1170.

Figure 11D:
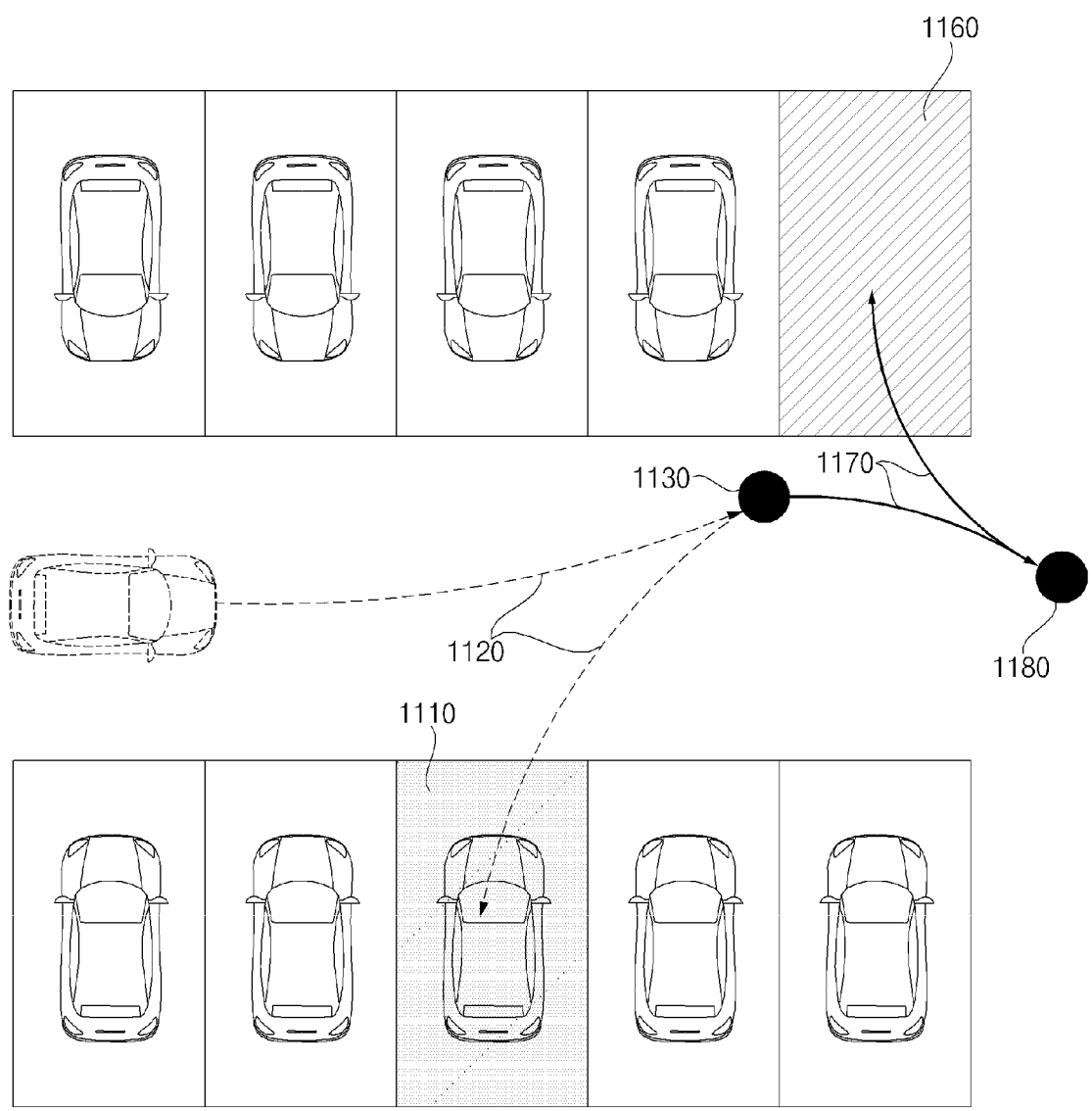

Referring to FIG. 11D, in some implementations, even in the case where the second path 1170 is generated during the parking operation along the first path 1120, performing a parking operation along the first path unless a user input is received may be set as a default setting.

Based on the default setting, the processor 757 may perform a parking operation along the first path 1120.

If a user input is received to perform a parking operation along the second path 1170, the processor 757 may perform a parking operation along the second path 1170.

In some examples, a user input may be received until the vehicle 100 reaches the first turnaround point 1130 and makes a turnaround.

Figure 11E:
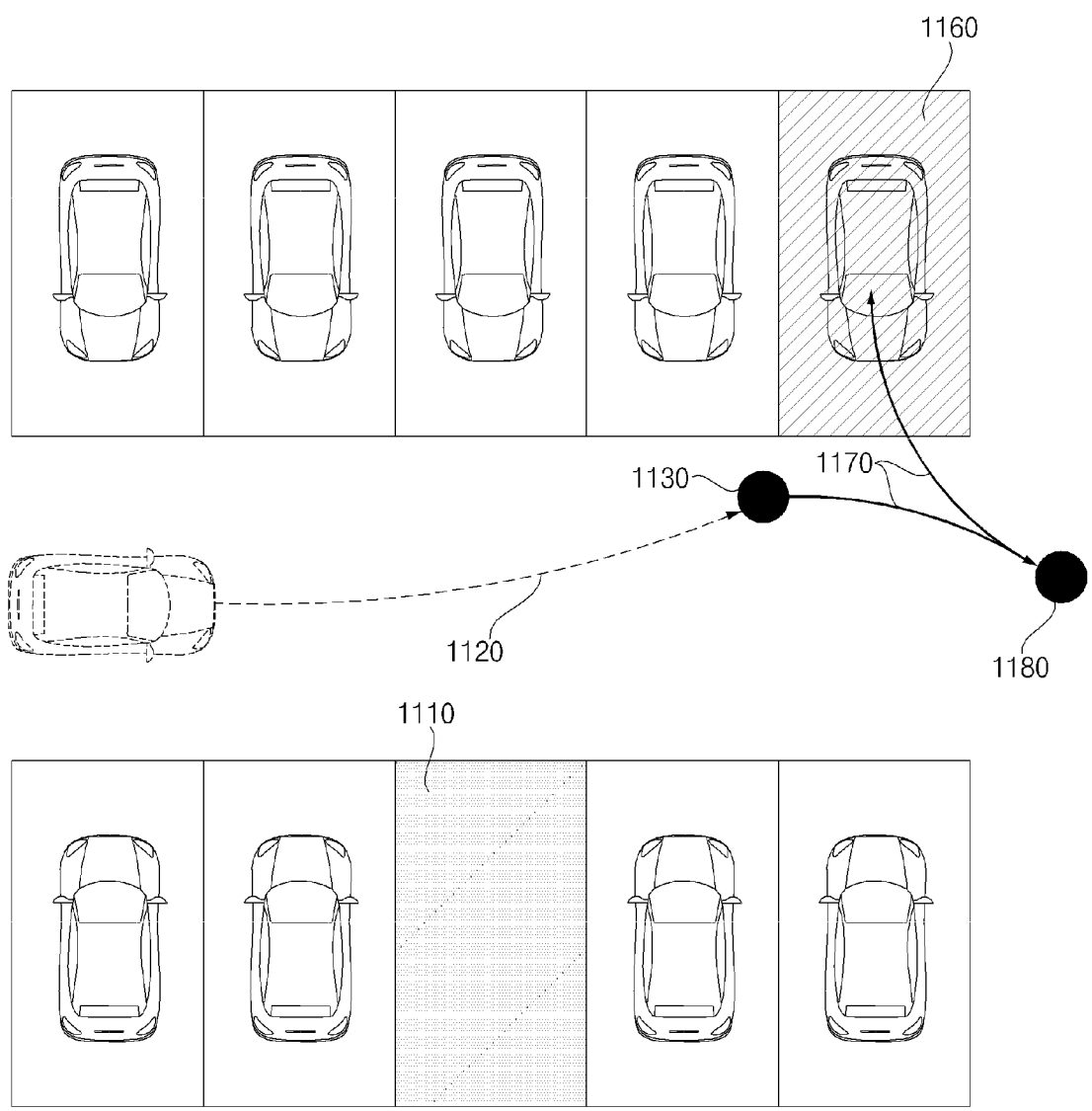

Referring to FIG. 11E, in some implementations, in the case where the second path 1170 is generated during a parking operation along the first path 1120, performing a parking operation along the second path 1170 unless a user input is received may be set as a default setting.

Based on the default setting, the processor 757 may perform a parking operation along the second path 1170.

If a user input is received to perform a parking operation along the first path 1120, the processor 757 may perform the parking operation along the first path 1120.

In some examples, a user input may be received until the vehicle 100 reaches the first turnaround point 1130 and makes a turnaround.

Figure 12:
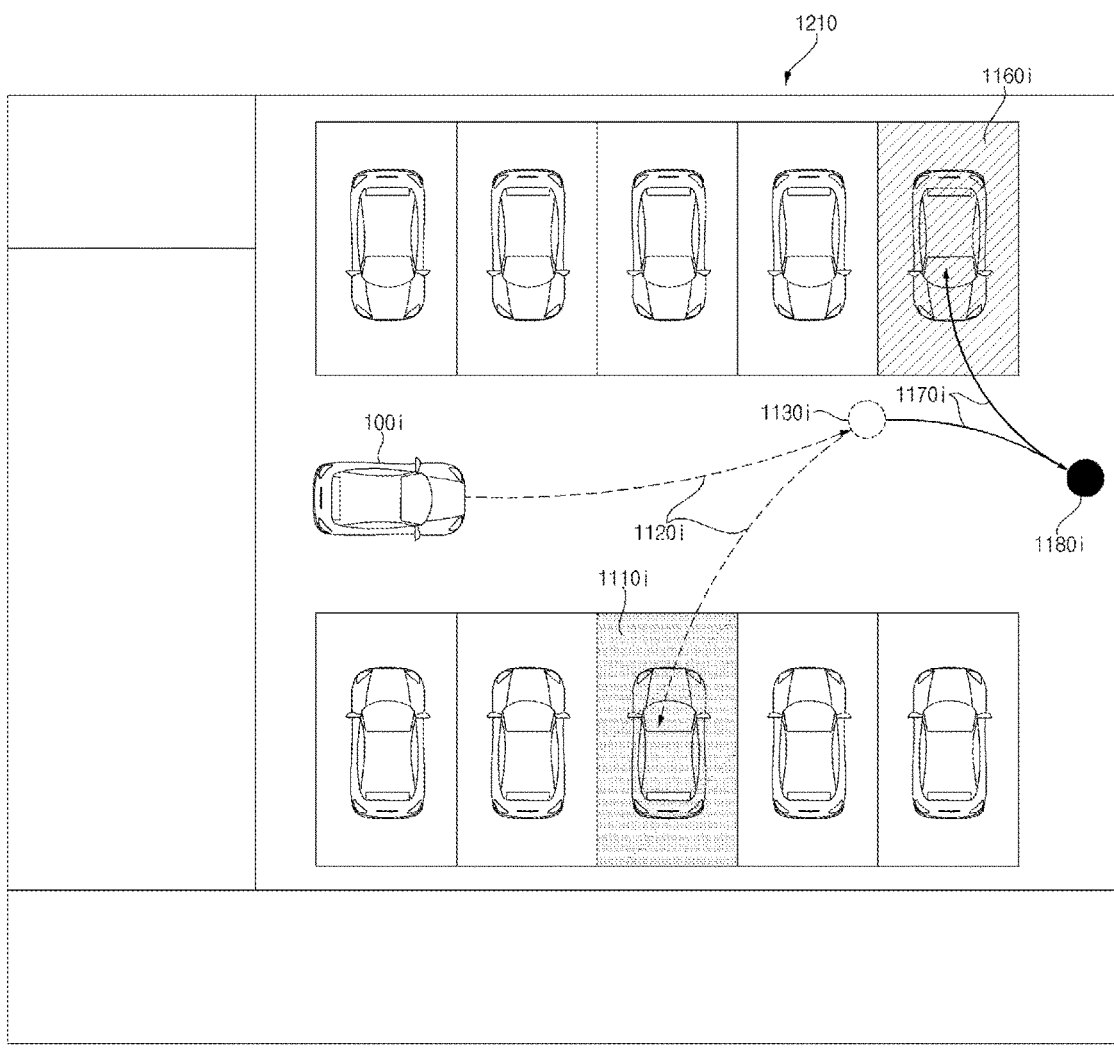
FIG. 12 is a diagram illustrating an example display operation.

FIG. 12 is a diagram illustrating an example display operation.

Referring to FIG. 12, the processor 757 may display an image corresponding to a parking situation in at least one area of the display unit 251.

The image 1210 may be a static image or a dynamic image.

For example, the processor 757 may display, on the display unit 251, the image 1210 in the form of a top view.

As shown in FIG. 12, the processor 757 may display, on the display unit 251, an image corresponding to at least part of a parking lot.

The processor 757 may display, on the display unit 251, an image corresponding to another vehicle located in the parking lot.

The processor 757 may display, on the display unit 251, an image 100$i$ corresponding to the vehicle 100.

For example, the processor 757 may control the display unit 251 so that the image 100$i$ of the vehicle 100 moves in sync with movement of the vehicle 100.

The processor 757 may display, on the display unit 251, an image 1110$i$ corresponding to a first parking space 1110.

The processor 757 may display, on the display unit 251, an image 1120$i$ corresponding to a first path 1120.

The processor 757 may display, on the display unit 251, an image 1130$i$ corresponding to at least one first turnaround point 1130.

The processor 757 may display, on the display unit 251, an image 1160$i$ corresponding to a second parking space 1160.

The processor 757 may display the image 1160$i$ to be distinguishable from the image 1110$i$ corresponding to the first parking space.

In some implementations, the processor 757 may display at least one of a shape, a color, or a transparency level of the image 1160i to be distinguishable from the image 1110i.

For example, the processor 757 may display the image 1110i based on at least one of a first shape, a first color, or a first transparency level.

For example, the processor 757 may display the image 1160i based on at least one of a second shape different from the first shape, a second color different from the first color, or a second transparency level different from the first transparency level.

The processor 757 may display, on the display unit 251, an image 1170i corresponding to a second path 1170.

The processor 757 may display the image 1170i to be distinguishable from the image 1120i corresponding to the first path.

In some implementations, the processor 757 may display at least one of a shape, a color, or a transparency level of the image 1170i to be distinguishable from the image 1120i.

For example, the processor 757 may display the image 1120i based on at least one of a first shape, a first color, or a first transparency level.

For example, the processor 757 may display the image 1170i based on at least one of a second shape different from the first shape, a second color different from the first color, or a second transparency level different from the first transparency level.

The processor 757 may display, on the display unit 251, an image 1180i corresponding to at least one second turnaround point 1180.

The processor 757 may display the image 1180i corresponding to the second turnaround point to be distinguishable from the image 1130i corresponding to the first turnaround point.

In some implementations, the processor 757 may display at least one of a shape, a color, or a transparency level of the image 118i to be distinguishable from the image 1130i.

For example, the processor 717 may display the image 1130i based on at least one of a first shape, a first color, or a first transparency level.

For example, the processor 757 may display the image 1180i based on at least one of a second shape different from the first shape, a second color different from the second color, or a second transparency level different from the first transparency level.

When the vehicle 100 moves, the processor 757 may display, on the display unit 251, an image 100i corresponding to a movement situation.

Movement situation information of the vehicle 100 may be based on information received from at least one of the object detection apparatus 300 or the sensing unit 120.

FIGS. 13A to 14B are diagrams illustrating example user input.

Figure 13A:
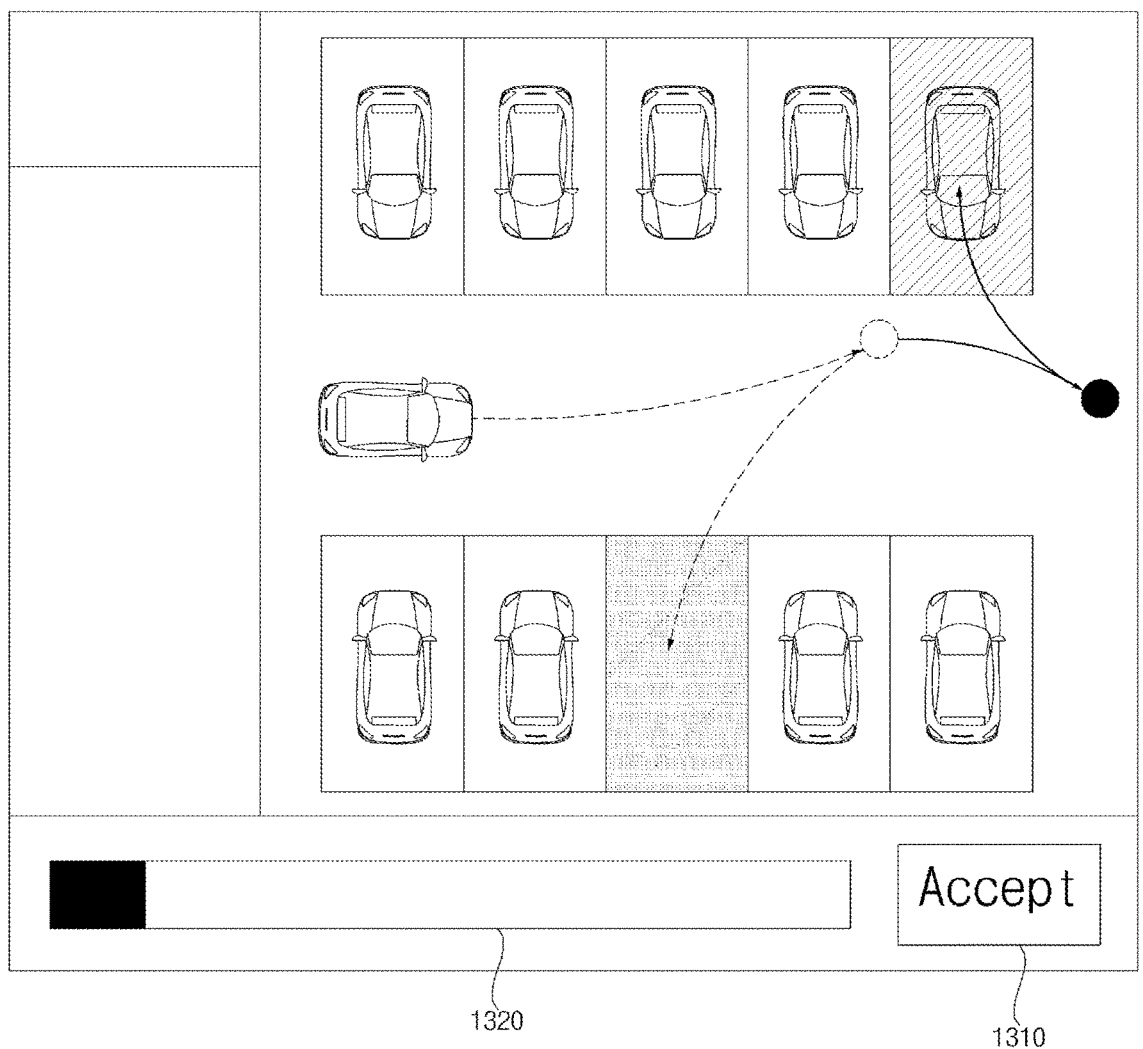
FIGS. 13A to 14B are diagrams illustrating example user input.

Referring to FIG. 13A, during a parking operation of the vehicle 100 along a first path 1120, the processor 757 may activate a first soft button 1310.

The first soft button 1310 may be a button that is activated to receive a user input for converting a parking operation along the first path 1120 into a parking operation along a second path 1170.

If a touch input on the first soft button 1310 is applied by a user while the first soft button 1310 is activated, the processor 757 may convert a parking path from the first path 1120 to the second path 1170. In this case, the processor 757 may perform a parking operation along the second path 1170.

Figure 13B:
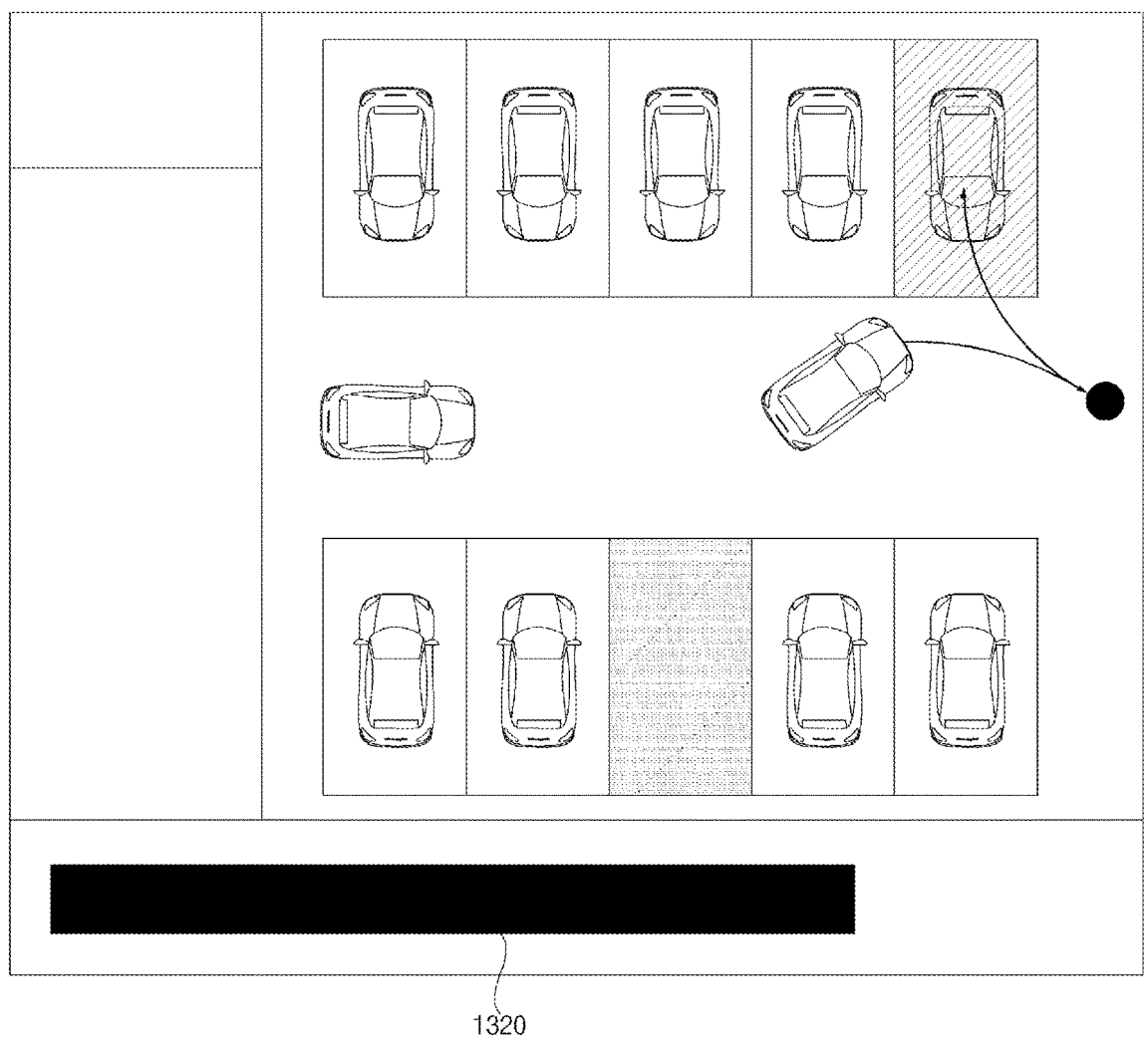

Referring to FIG. 13B, when the vehicle 100 reaches the first turnaround point 1130 and makes a turnaround at the first turnaround point 1130, the processor 757 may deactivate the first soft button 1310.

The processor 757 may display a graphic object (e.g., a progress bar 1320) corresponding to a time remaining until the first soft button 1310 is deactivated.

As illustrated in FIGS. 13A and 13B, the processor 757 may display a progress bar 1320 in one area of the display unit 251.

The processor 757 may determine the entire length of the progress bar 1320 corresponding to information on an expected time when the vehicle 100 is expected to reach the first turnaround point 1130.

As the vehicle 100 moves toward the first turnaround point 1130, the processor 757 may apply an animation effect to the progress bar 1320 to correspond to information on a time by which the expected time has been reduced.

The processor 757 may control the display unit 251 to change at least one of a shape, a color, or a transparency level of the progress bar 1320 in a specific direction.

The processor 757 may determine a whole length of the progress bar 1320 to correspond to information on a distance between the vehicle 100 and the first turnaround point 1130.

As the vehicle 100 moves toward the first turnaround point 1130, the processor 757 may apply an animation effect to the progress bar 1320 to correspond to information on a distance by which the whole length of the progress bar 1320 has been reduced.

The processor 757 may control the display unit 251 to change at least one of a shape, a color, or a transparency level of the progress bar 1320 in a specific direction.

Figure 14A:
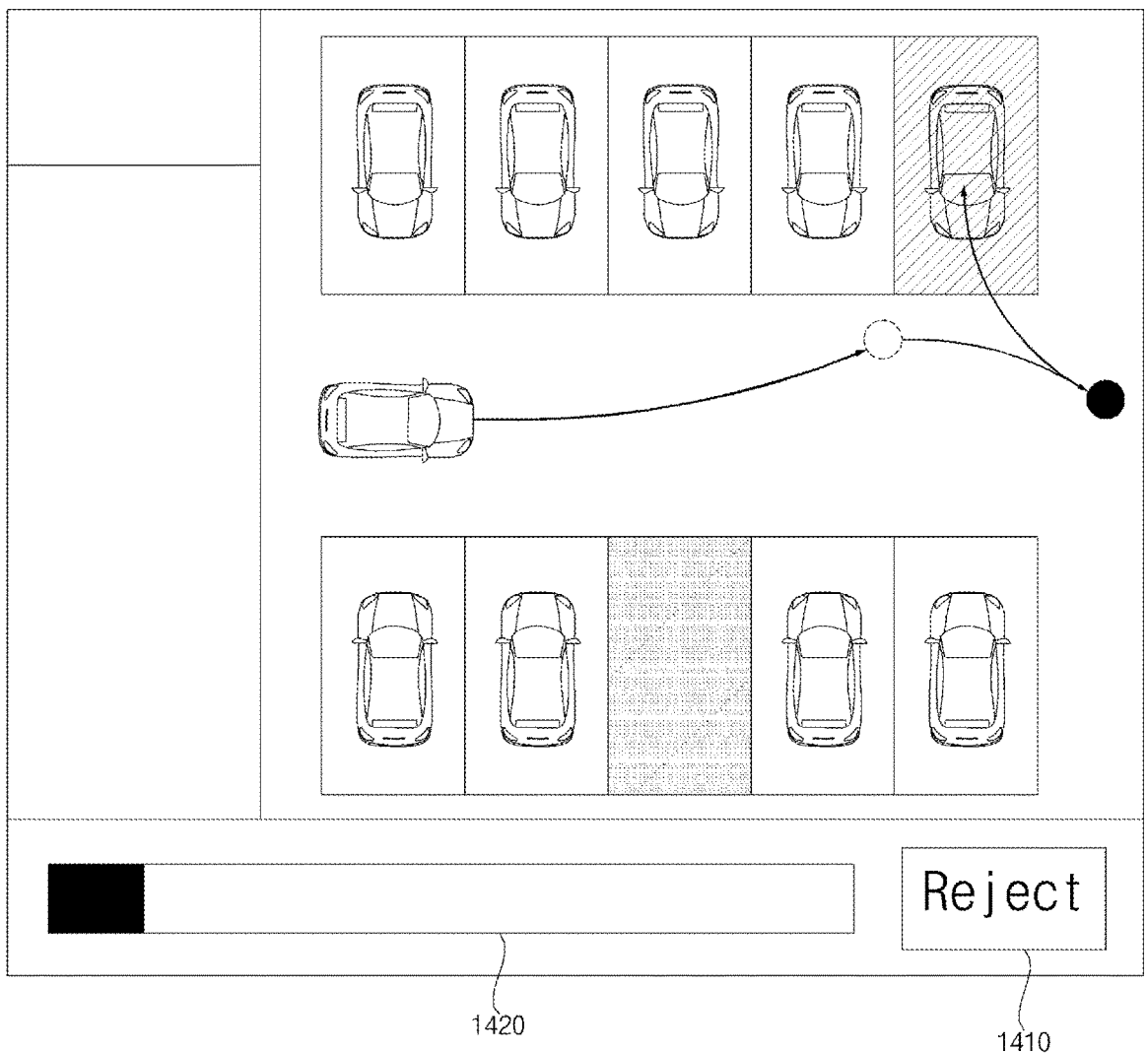

Referring to FIG. 14A, during a parking operation of the vehicle 100 along the second path 1170, the processor 757 may activate the second soft button 1410.

The second soft button 1410 may be a button that is activated to receive a user input for converting a parking operation along the second path 1170 into a parking operation along the first path 1120.

If a touch input on the second soft button 1410 is applied by a user while the second soft button 1410 is activated, the processor 757 may change a parking path from the second path 1170 to the first path 1120. In this case, the processor 757 may perform a parking operation along the first path 1120.

Figure 14B:
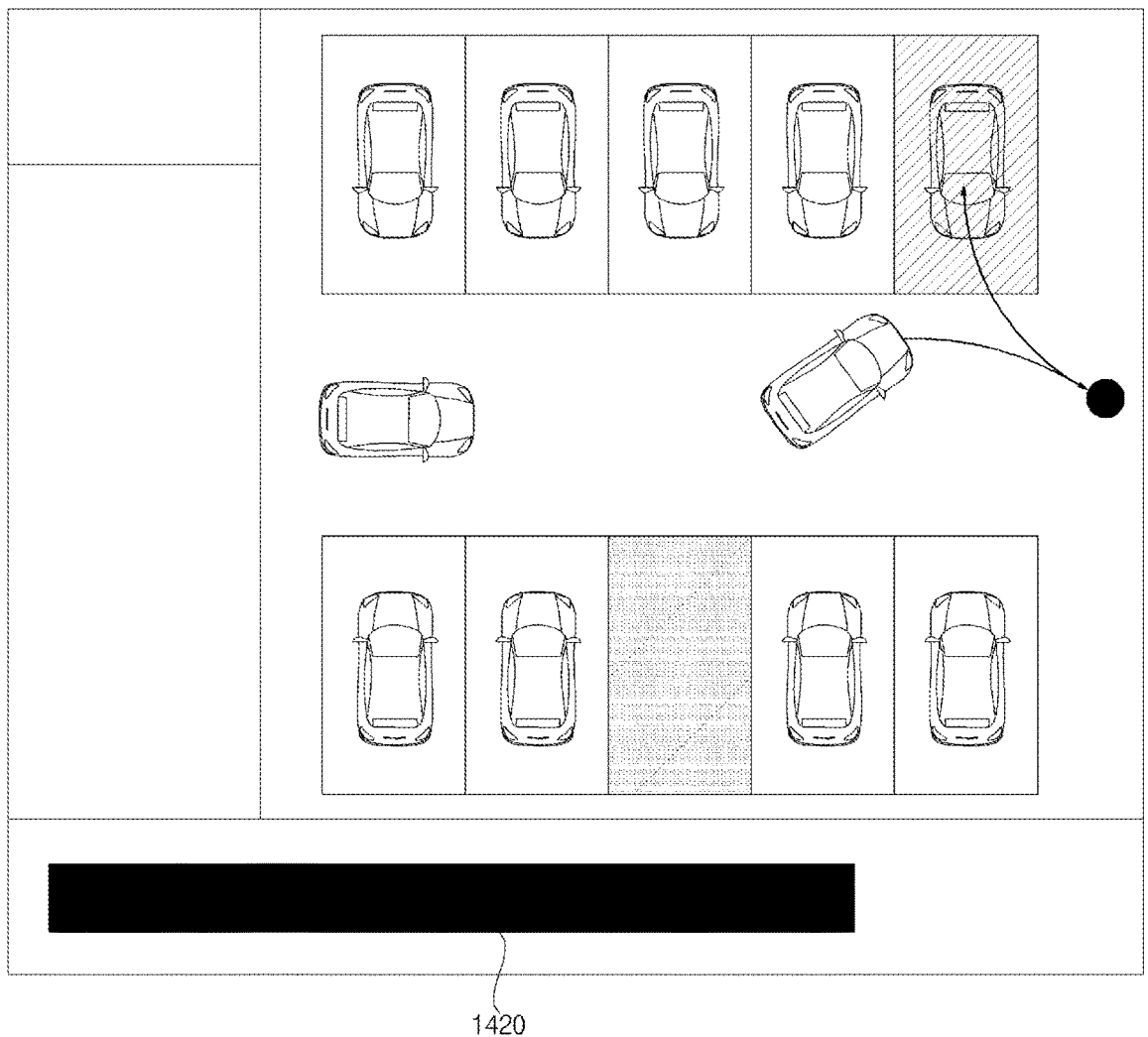

Referring to FIG. 14B, when the vehicle 100 reaches the first turnaround point 1130 and makes a turnaround at the first turnaround point 1130, the processor 757 may deactivate the second soft button 1410.

The processor 757 may display a graphic object (e.g., a progress bar 1420) corresponding to a time remaining until the second soft button 1410 is deactivated.

As illustrated in FIGS. 14A and 14B, the processor 757 may display a progress bar 1420 in one area of the display unit 251.

In some examples, description about the progress bar 1320 shown in FIGS. 13A and 13B may be applied to the progress bar 1420 shown in FIGS. 14A and 14B.

Figure 15:
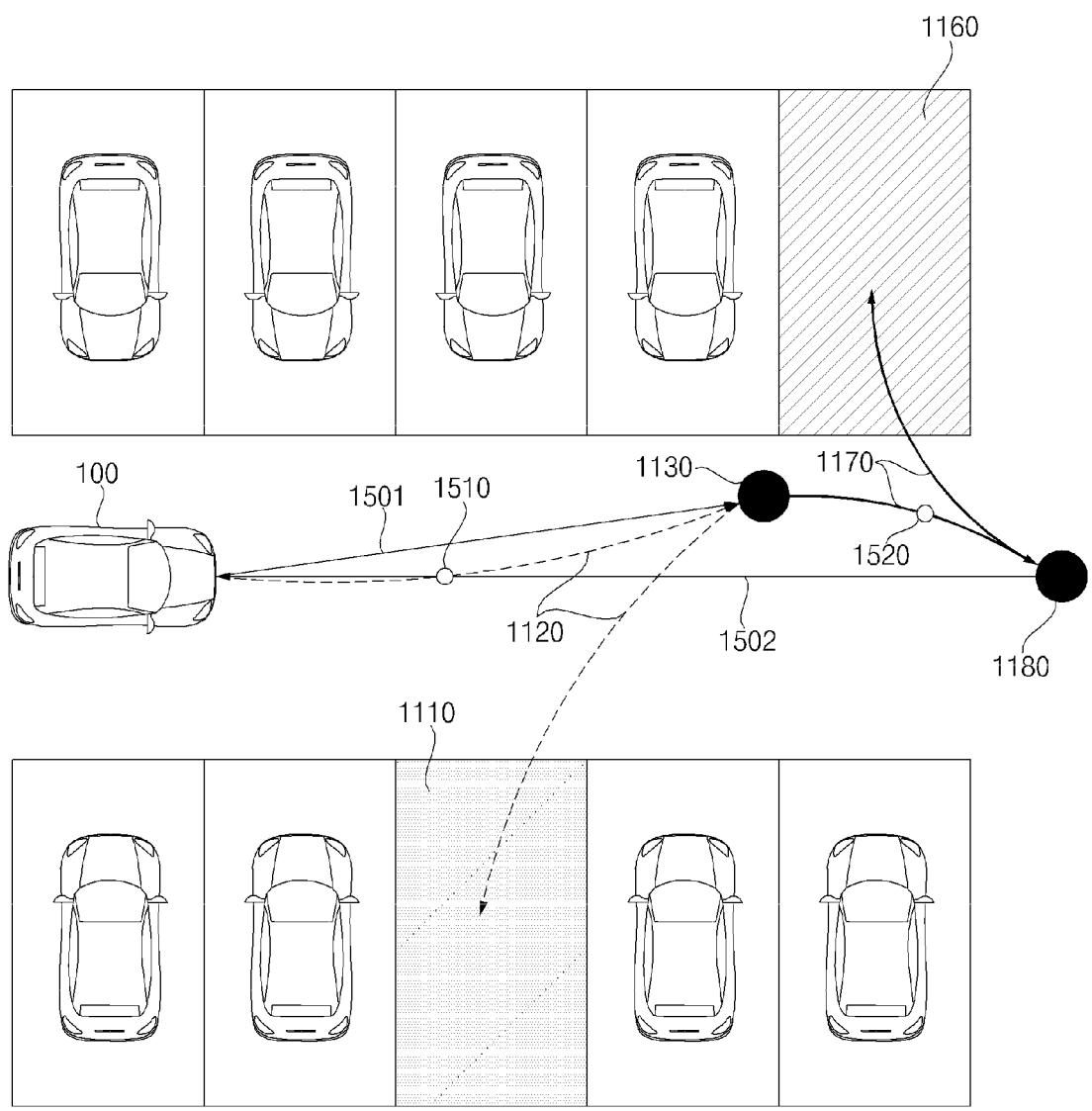
FIG. 15 is a diagram illustrating an example autonomous parking system.

FIG. 15 is a diagram illustrating an example autonomous parking system.

Referring to FIG. 15, the processor 757 may set a second to be a second turnaround point 1180 that is distal from the vehicle 100 than a first turnaround point 1130.

A second distance 1502 from the vehicle 100 to the second turnaround point 1180 may be greater than a first distance 1501 from the vehicle 100 to the first turnaround point 1130.

When the processor 757 performs a parking operation along the second path 1170, the vehicle 100 may reach the second turnaround point 1180 through the first turnaround point 1130.

In this case, the processor 757 may perform a control so that a variation of speed before passing the first turnaround point 1130 and a variation of speed after passing the first turnaround point 1130 are different.

As illustrated in FIG. 15, the processor 757 may control the vehicle 100 to accelerate before passing a first point on the first path 1120.

The first point 1510 may be a point between a position of the vehicle 100 before the parking operation and the first turnaround point 1130.

After the vehicle 100 passes the first point 1510, the processor 757 may control the vehicle 100 to decelerate until the vehicle 100 reaches the first turnaround point 1130.

The processor 757 may control the vehicle 100 to be stopped at the first turnaround point 1130 for a preset time (e.g., one second).

After the vehicle 100 passes the first turnaround point 1130, the processor 757 may control the vehicle 100 to accelerate.

Before the vehicle 100 passes a second point 1520 on the second path 1170, the processor 757 may control the vehicle to accelerate.

The second point 1520 may be a point between the first turnaround point 1130 and the second turnaround point 1180.

After the vehicle 100 passes the second point 1520, the processor 757 may control the vehicle 100 to decelerate until reaching the second turnaround point 1180.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. An autonomous parking system comprising:
an object detection apparatus comprising at least one sensor configured to detect an object outside a vehicle and to generate sensing data about the object;
a display; and
one or more processors configured to:
perform an initial parking operation for parking the vehicle into a first parking space along a first path, the first path including one or more first turnaround points,
during the initial parking operation, detect a second parking space using the object detection apparatus,
generate a second path for parking the vehicle into the second parking space, the second path including one or more second turnaround points,
in response to user input, perform at least one of a first parking operation along the first path or a second parking operation along the second path,
during the first parking operation along the first path, cause the display to display a first button configured to receive user input that indicates a change of parking operation to the second parking operation along the second path, and
deactivate the first button to thereby prevent the change of parking operation to the second parking operation based on the vehicle arriving at the one or more first turnaround points and making a turn at the one or more first turnaround points.

2. The autonomous parking system according to claim 1, wherein the one or more processors are further configured to detect the second parking space based on at least one of: information on a distance from the second parking space to a final destination; information on a size of the second parking space; information on a duration estimated to complete parking at the second parking space; or information on a distance from the second parking space to the vehicle.

3. The autonomous parking system according to claim 1, wherein the one or more processors are further configured to determine the one or more second turnaround points included in the second path.

4. The autonomous parking system according to claim 3, wherein the one or more processors are further configured to determine the one or more second turnaround points based on at least one of: a distance from the vehicle to the second parking space; a direction from the vehicle to the second parking space; or a speed of the vehicle.

5. The autonomous parking system according to claim 3, wherein the one or more processors are further configured to, based on a number of the one or more second turnaround points being less than or equal to a reference value, perform the second parking operation along the second path in response to user input.

6. The autonomous parking system according to claim 3, wherein the one or more processors are further configured to cause the display to display a first graphic object corresponding to the one or more first turnaround points and a second graphic object corresponding to the one or more second turnaround points, the second graphic object being visually different from the first graphic object.

7. The autonomous parking system according to claim 6, wherein the one or more processors are further configured to, based on a number of the one or more second turnaround points being less than or equal to a reference value, cause the display to display the second graphic object.

8. The autonomous parking system according to claim 3, wherein the one or more processors are further configured to determine the one or more second turnaround points that are farther from the vehicle than the one or more first turnaround points.

9. The autonomous parking system according to claim 8, wherein the one or more processors are further configured to generate a control signal to:
control the vehicle to travel to the one or more first turnaround points at a first variation of speed; and
based on the vehicle passing the one or more first turnaround points, control the vehicle to travel from the one or more first turnaround points at a second variation of speed, the second variation of speed being different from the first variation of speed.

10. The autonomous parking system according to claim 9, wherein the one or more processors are further configured to generate the control signal to:
decelerate the vehicle before the vehicle passes the one or more first turnaround points; and
based on the vehicle passing the one or more first turnaround points, accelerate the vehicle and then decelerate the vehicle.

11. The autonomous parking system according to claim 1, wherein the one or more processors are further configured to, during the second parking operation along the second path, cause the display to display a second button configured to receive user input that indicates a change of parking operation to the first parking operation along the first path.

12. The autonomous parking system according to claim 11, wherein the one or more processors are further configured to deactivate the second button based on the vehicle arriving at the one or more first turnaround points and making a turn at the one or more first turnaround points.

13. The autonomous parking system according to claim 12, wherein the one or more processors are further configured to cause the display to display a graphic object corresponding to a period of time estimated for the vehicle to arrive at the one or more second turnaround points.

14. The autonomous parking system according to claim 1, wherein the one or more processors are further configured to cause the display to display a graphic object corresponding to a period of time estimated for the vehicle to arrive at the one or more first turnaround points.

15. The autonomous parking system according to claim 1, wherein the one or more processors are further configured to:
cause the display to display a first graphic image corresponding to the first path;
cause the display to display a second graphic image corresponding to the second path, the second graphic image being visually different from the first graphic image;
cause the display to display the first button configured to receive user input indicating a change of parking operation to the second parking operation along the second path; and
in response to reception of user input at the first button, generate a control signal for parking the vehicle along the second path.

16. The autonomous parking system according to claim 1, wherein the one or more processors are further configured to:
cause the display to display a first graphic image corresponding to the first path;
cause the display to display a second graphic image corresponding to the second path, the second graphic image being visually different from the first graphic image;
perform the second parking operation for parking the vehicle into the second parking space along the second path;
cause the display to display a second button indicating a change of parking operation to the first parking operation along the first path; and
in response to reception of user input at the second button, generate a control signal for parking the vehicle along the first path.

17. The autonomous parking system according to claim 1, wherein the at lease one sensor includes at least one of a camera, a radar, a lidar, an ultrasonic sensor, an infrared sensor, or a processor.

18. The autonomous parking system according to claim 1, wherein the one or more processors are further configured to, based on the vehicle making the turn at the one or more first turnaround points, remove the first button from the display such that the vehicle continues the first parking operation into the first parking space.

19. A vehicle comprising:
one or more wheels;
wherein the one or more wheels are configured to be driven based on a control signal provided from an autonomous parking system, the autonomous parking system comprising:
an object detection apparatus comprising at least one sensor configured to detect an object outside the vehicle and to generate sensing data about the object,
a display, and
one or more processors configured to:
perform an initial parking operation for parking the vehicle into a first parking space along a first path, the first path including one or more first turnaround points,
during the initial parking operation, detect a second parking space using the object detection apparatus,
generate a second path for parking the vehicle into the second parking space, the second path including one or more second turnaround points,
based on user input, perform at least one of a first parking operation along the first path or a second parking operation along the second path,
during the first parking operation along the first path, cause the display to display a first button configured to receive user input that indicates a change of parking operation to the second parking operation along the second path, and
deactivate the first button to thereby prevent the change of parking operation to the second parking operation based on the vehicle arriving at the one or more first turnaround points and making a turn at the one or more first turnaround points.

* * * * *